United States Patent
Crain et al.

(10) Patent No.: US 6,502,321 B1
(45) Date of Patent: Jan. 7, 2003

(54) POLE SECTION FOR SURVEYING EQUIPMENT

(75) Inventors: Stephen B. Crain, Cape Girardeau, MO (US); Ronnie D. Everly, Mounds, IL (US); Larry W. Essex, Villa Ridge, IL (US); Ralph C. Mize, Mounds, IL (US); Jerry L. Williamson, Olmsted, IL (US)

(73) Assignee: Crain Enterprises, Inc., Mound City, IL (US)

( * ) Notice: Subject to any disclaimer, the term of this patent is extended or adjusted under 35 U.S.C. 154(b) by 109 days.

(21) Appl. No.: 09/648,945

(22) Filed: Aug. 25, 2000

(51) Int. Cl.7 ............................................. G01C 15/06
(52) U.S. Cl. ................................... 33/296; 33/293
(58) Field of Search ........................ 33/295, 296, 809, 33/810, 811, 812, 370, 373

(56) References Cited

U.S. PATENT DOCUMENTS

| | | | |
|---|---|---|---|
| 2,518,128 A | | 8/1950 | Dufilho |
| 2,947,557 A | | 8/1960 | Schwab et al. |
| 3,762,058 A | * | 10/1973 | Heater ........................ 33/161 |
| 3,843,302 A | * | 10/1974 | Petzetakis .................. 425/388 |
| 4,339,880 A | | 7/1982 | Hall |
| 4,549,360 A | * | 10/1985 | Allen ......................... 33/293 |
| 4,621,431 A | * | 11/1986 | Fatool et al. ................. 33/161 |
| 4,635,972 A | | 1/1987 | Lyall |
| 4,641,433 A | | 2/1987 | Sing |
| 4,646,827 A | * | 3/1987 | Cobb ......................... 166/88 |
| 4,879,815 A | * | 11/1989 | Vischer ...................... 33/293 |
| 4,899,452 A | * | 2/1990 | Schafer ...................... 33/296 |
| 4,989,332 A | * | 2/1991 | Worrallo ..................... 33/342 |
| 5,255,441 A | * | 10/1993 | Burgess et al. ............... 33/295 |
| 5,442,866 A | * | 8/1995 | Woods ........................ 33/760 |
| 5,459,934 A | * | 10/1995 | Heroux ....................... 33/373 |
| 5,566,460 A | | 10/1996 | Bates |
| 5,595,410 A | * | 1/1997 | Wilson et al. ............... 292/306 |
| 5,601,494 A | * | 2/1997 | Duggan .................. 464/182 Q |
| 5,743,577 A | * | 4/1998 | Newman Jr. et al. ........ 292/19.1 |
| 5,884,240 A | | 3/1999 | Edgar et al. |
| 5,915,810 A | * | 6/1999 | Cameron ..................... 33/809 |
| 6,026,581 A | * | 2/2000 | Gruetzmacher .............. 33/370 |
| 6,045,288 A | * | 4/2000 | Pasternak et al. ......... 403/109.3 |
| 6,286,219 B1 | * | 9/2001 | Palumbo II ................... 33/286 |
| 6,332,277 B1 | * | 12/2001 | Owac et al. .................. 33/373 |
| 2002/0003985 A1 | * | 1/2002 | Hannsson et al. ......... 403/359.1 |

OTHER PUBLICATIONS

SECO Manufacturing Co., Inc.: SECO Online Catalog, 3 pages; admitted prior art. (No Date).
CST/Berger; CST/Berger Online Catalog; 4 pages; admitted prior art. (No Date).

* cited by examiner

Primary Examiner—Diego Gutierrez
Assistant Examiner—Tania C. Courson
(74) Attorney, Agent, or Firm—Senniger, Powers, Leavitt & Roedel

(57) ABSTRACT

A light weight surveying pole which is of robust and highly accurate construction. A lock for fixing telescoping sections of the pole provides fixed positioning without high initial clamping forces. An air cushion system inhibits damaging the pole sections when they are retracted, but the pole sections can be simply pulled apart without any other required disassembly for cleaning or repair. Fittings for use in screw-together pole sections are constructed to permit location within mating pole sections prior to application of adhesive for greater precision and maintenance of coincident axes of the pole sections when screwed together. Also, the end faces of the fittings are particularly formed to facilitate complete face-to-face contact and avoid misalignment when the fittings are attached. A cover can be attached over a point of the surveying pole when the point it not needed, and the cover can be stowed on the surveying pole when the point is used. Moreover, a smaller tip of the point can be removed from a larger body if necessary to replace the tip.

27 Claims, 21 Drawing Sheets

POLE SECTION FOR SURVEYING EQUIPMENT

BACKGROUND OF THE INVENTION

This invention relates generally to surveying equipment and more particularly to surveying equipment having lightweight and yet robust, precision construction.

Surveying equipment and particularly the support structure therefore must be able to withstand all kinds of environmental conditions while retaining its integrity and dimensional accuracy. In many instances, the dimensional accuracy is imperative in order to obtain the correct measurements in a geographic survey. For instance, prism poles and global positioning satellite (GPS) poles must be able to retain a substantially fixed position of extension as they are moved from place to place over uneven terrain and in all kinds of weather. Prism poles include two or more interfitting pole sections, and support a prism or other measurement device at the top used to sight or determine positions with laser, modulated infrared, angular and/or GPS position locators or like surveying systems. The prism reflects light back to the position locator for determining the location of the prism at different locations in a survey. The prism pole may be constructed with telescoping sections so that it may be collapsed to a reduced height (e.g., about four feet) for storage and transport, and then extended to its operating height which may be, typically, eight feet or more. In topological surveys, it is important that the pole be able to maintain its extended height as it is moved from place to place. It is therefore, critical to be able to lock the pole sections in a fixed position of extension in such a way as to have them stay. Moreover, the pole must maintain its longitudinal axis as it is extended so that its extended height is accurate every time. Similarly, the pole must be able to withstand numerous cycles of extension and retraction, and frequent rough handling while maintaining this accuracy. Still further, it is frequently desirable to completely detach the telescoping sections without substantial disassembly of the surveying pole or loss of accuracy upon reassembly.

The need for durability and accuracy has traditionally led to making surveying poles out of metal. However, metal poles can expand and contract significantly with changes in the temperature of the surrounding environment which is detrimental to accuracy of the survey. Metal poles are also capable of plastic deformation which can lead to inaccurate measurements. Carrying a heavy metal pole over uneven or broken terrain, as will be frequently necessary in surveying, can be very difficult and physically taxing. Using metal poles in the outdoors also presents a risk of lightening strike. It is possible to make poles out of lighter weight, non-conducting material, such as fiberglass, which are sturdy and weather-resistant. However, these poles will typically not withstand the clamping forces conventionally applied to metal poles to hold them in a fixed extension. Lower clamping forces may not adequately hold the pole sections in position. A similar problem is present when attaching something which must maintain a precise orientation, such as a level, to the pole. Non-metal materials may also be less likely to withstand impact forces associated with forcefully retracting the pole sections.

The surveying poles or other surveying equipment support structure may have telescoping sections, screw-together sections or a combination of the two. It is important to be able to rapidly collapse the poles for storage and transport. Also for cleaning in the field, the pole sections need to be able to be quickly and accurately disassembled and reassembled. Regardless of the material of the pole, it is often difficult to economically manufacture the pole sections so that they will maintain the same linear axis every time they are screwed together. One problem is the initial installation of screw fittings in ends of the pole sections. Care must be taken to achieve axial alignment upon installation. Another problem is the accumulation of debris on the fittings so that when screwed together, the fittings do not achieve face-to-face engagement which results in axial misalignment of the pole sections. For telescopingly interfitted pole sections, it is important to be able to easily disassociate the sections for cleaning or repair, and reassemble them while maintaining accuracy.

It is also not uncommon for these poles to have some accessory equipment. For instance, the bottom of a prism pole is conventionally equipped with a steel point to locate the pole on the ground. However in circumstances where the ground is soft, it is undesirable to have the point engaging the ground because the point tends to penetrate the surface of the ground. As a result, the location of the top of the pole above the ground can be inconsistent. Conventionally, the steel point has been removed and replaced with a blunt or greatly enlarged blunt end under these circumstances. The replacement involves several steps and it is necessary to carry the blunt end (or the steel point) around separately from the pole until used. The steel point can be difficult to safely carry because its point can be rather sharp.

SUMMARY OF THE INVENTION

Among the several objects and features of the present invention may be noted the provision of a lightweight surveying pole which is sturdy and weather-resistant; the provision of such a surveying pole which accurately maintains an extended height; the provision of such a surveying pole which maintains sections in a coaxial relation; the provision of such a surveying pole which can be disassembled and accurately reassembled for cleaning and repair; the provision of such a surveying pole which can be reconfigured with minimal steps; and the provision of such a surveying pole which can be efficiently manufactured with high accuracy.

Further among the several objects and features of the present invention may be noted the provision of a pole section for surveying equipment and a method of making such a pole section which is lightweight; the provision of such a pole section and method for making a pole section which can be repeatedly disassembled and accurately reassembled; and the provision of such a method which can be efficiently carried out with high accuracy.

Generally, a pole section constructed according to the principles of the present invention for use in surveying equipment is elongate and has opposite ends at least one of which is open. The pole section has an interior surface in the open end and a fitting received in the open end of the pole section. The fitting includes first and second spaced circumferential engagement surfaces in contact with the interior of the pole section for precisely locating the fitting relative to the pole section and a circumferential channel located between the engagement surfaces. The channel is spaced from the pole section, and an adhesive located in the channel and bonding the fitting to the pole section.

In another aspect of the present invention, a pole section for use in surveying equipment is elongate and having opposite ends at least one of which is open. The pole section has an interior surface in the open end and a fitting received and held in the open end of the pole section. The fitting is formed with a connector element adapted for connection with a corresponding connector element of another component of the surveying equipment. The fitting includes an axially facing end surface having a surface area and facing axially outward from the pole section. The axially facing surface including a peripheral engagement portion constitutes a first smaller portion of the axially facing surface area, and an axially recessed portion constitutes a second larger portion of the surface area recessed axially from the peripheral engagement portion thereby to facilitate full face-to-face engagement of the engagement portion with said other component of the surveying equipment.

In a still further aspect of the invention, a method of making a pole section for surveying equipment generally comprises the steps of providing an elongate member having opposite ends at least one of which is open and an interior surface inside the open end, and a fitting having an end surface, first and second spaced circumferential engagement surfaces, a circumferential channel located between the engagement surfaces and an adhesive passage opening at one end at the end surface of the fitting and at another end in the channel. The fitting is inserted into the open end of the elongate member such that the end surface faces axially outwardly of the open end of the elongate member and the circumferential engagement surfaces engage the interior surface and align the fitting with respect to the elongate member. Adhesive is injected through the adhesive passage from the end surface of the fitting as inserted into the elongate member into the channel for bonding the fitting to the elongate member.

Other objects and features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENTS

Figure 1:
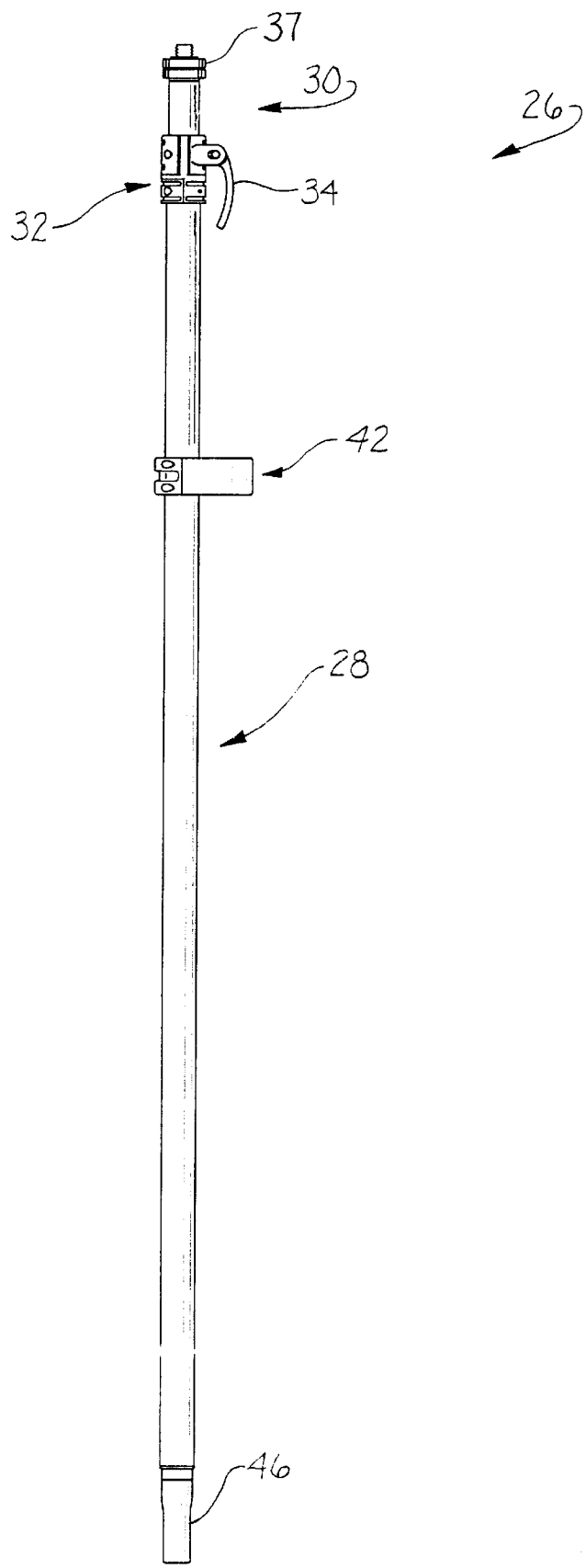
FIG. 1 is an elevation of a prism pole constructed according to the principles of the present invention.
Figure 2:
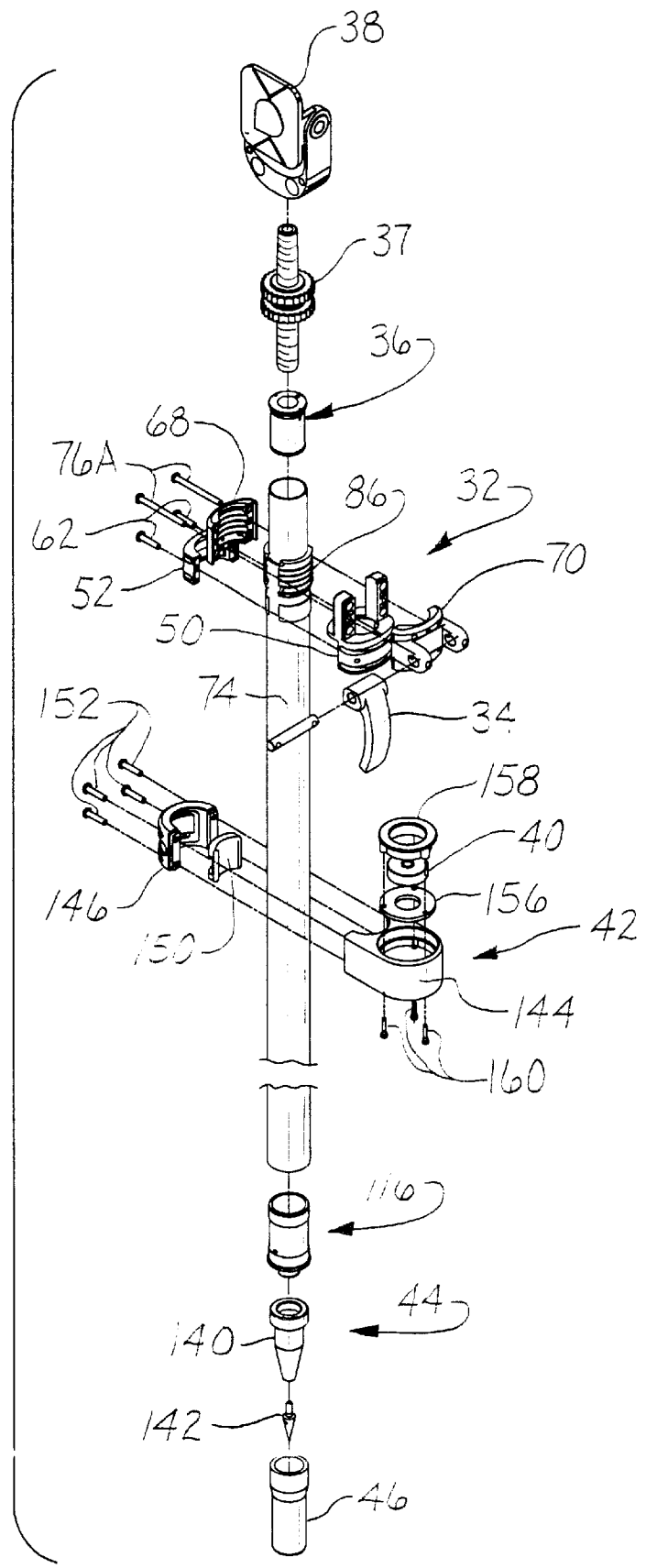
FIG. 2 is an exploded perspective of the prism pole.
Figure 3:
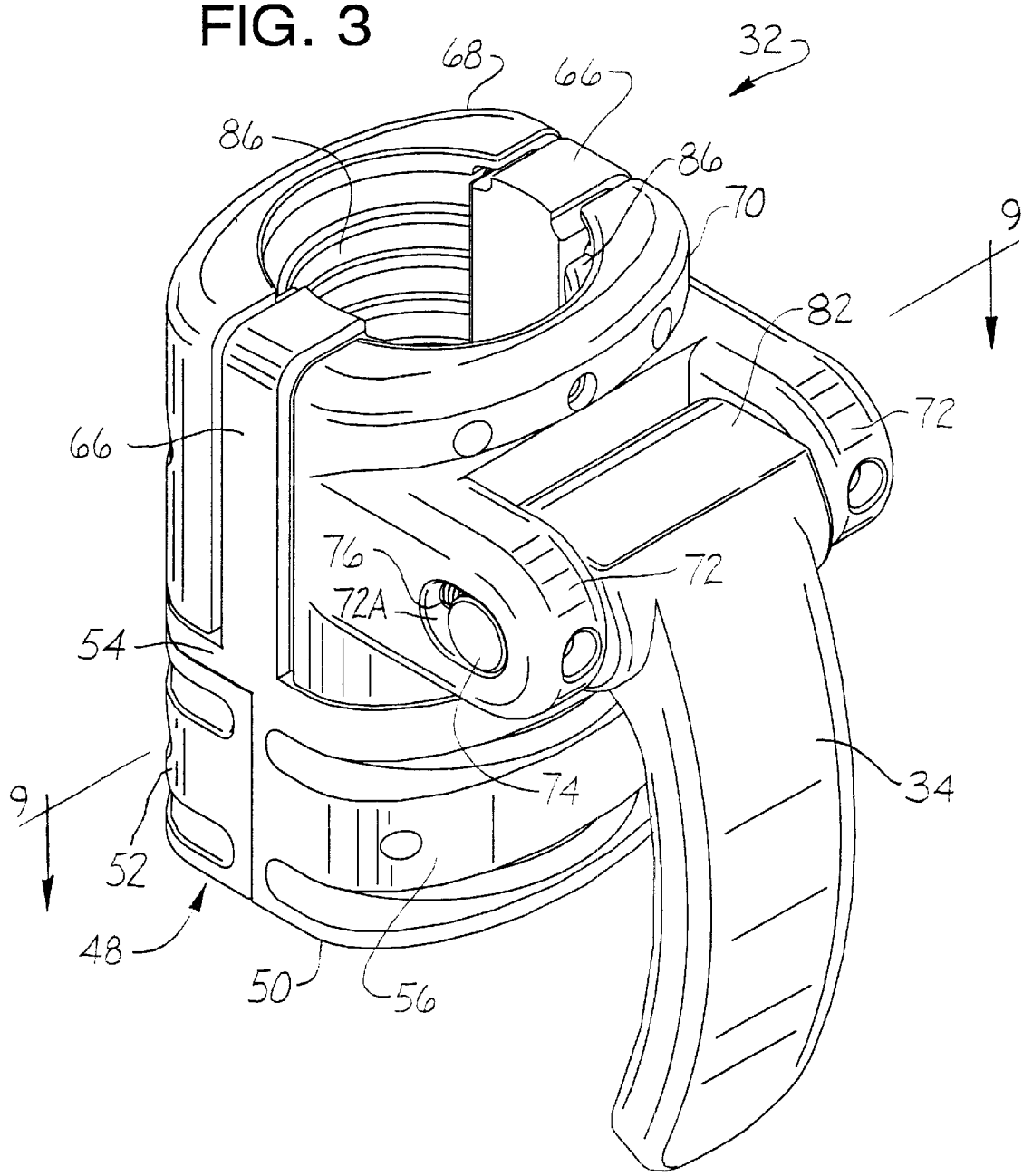
FIG. 3 is a perspective of a locking mechanism of the prism pole.
Figure 4:
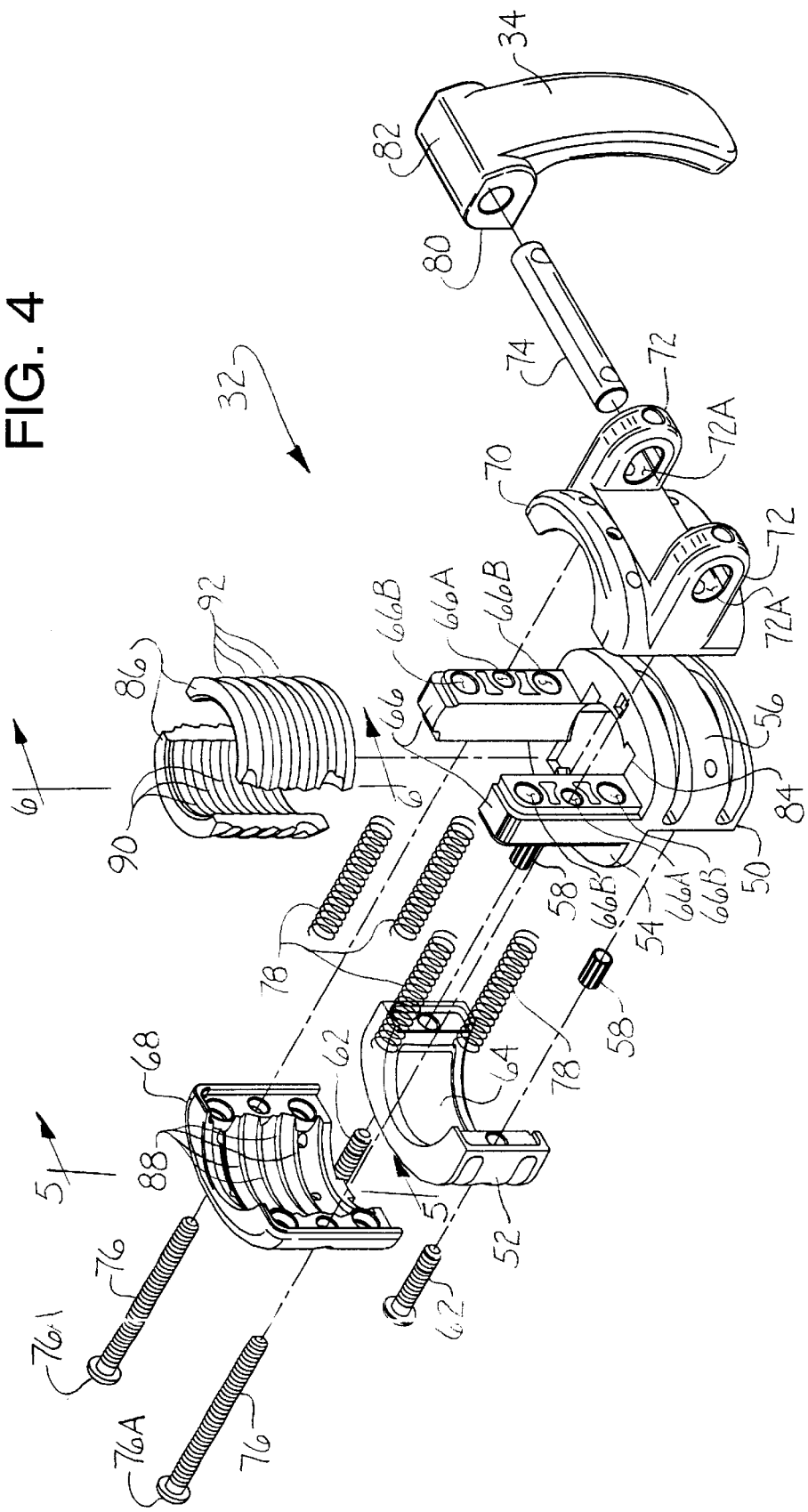
FIG. 4 is an exploded perspective of the locking mechanism.

Referring now to the drawings, and in particular to FIGS. 1 and 2, a surveying pole 26 (broadly, "surveying equipment") constructed according to the principles of the present invention is shown to comprise a first pole section 28 and a second pole section 30 telescopingly received in the first pole section (the reference numerals designating the subjects generally). In the preferred embodiments, the pole sections are made out of a lightweight, non-metallic composite material such as fiberglass. However, it is to be understood that the pole sections could be made of a lightweight (typically lower strength) metal or other composite material without departing from the scope of the present invention. In FIGS. 1 and 2, the second pole section 30 is retracted almost fully within the first pole section 28. Preferably, the second pole section 30 has graduated indicia (not shown) marked thereon for indicating the height of the pole as the second section is extended from the first section 28. A locking mechanism (indicated generally at 32) attached to the first pole section 28 is capable of releasably clamping the second pole section 30 in a fixed position of extension relative to the first pole section by moving a lever 34 of the locking mechanism.

A female end fitting, generally indicated at 36, is located at the top of the second pole section 30 and receives a mount 37 for mounting a prism 38 (FIG. 2) or other surveying device (e.g., a GPS antenna) at the top of the pole 26. The references to "top", "bottom", "lower" and "upper" are used for convenience in describing relative position of parts, and apply when the surveying pole 26 is in ordinary use as shown in FIG. 1. However, these and other positional terms do not require the surveying pole 26 to maintain any particular orientation to fall within the scope of the invention. The prism 38 reflects back infrared or laser light from a position locator for establishing the position and/or elevation of the location where the surveying pole 26 is placed. A level vial 40 in a level vial holder, generally indicated at 42 and affixed to the first pole section 28, is used to maintain the surveying pole 26 is a vertical position while measurements are being taken. The lower end of the surveying pole 26 has a metal point (generally indicated at 44 in FIG. 2) screwed into the first pole section 28 for engaging the ground. The metal point 44 can be covered by a shoe 46, as is shown in FIG. 1 for use in conditions described hereinafter.

Referring now to FIGS. 3–9, the locking mechanism 32 includes a base indicated generally at 48 comprising a first base member 50 and a second base member 52. In the preferred embodiments, the first and second members of the base are primarily made of a substantially rigid plastic (e.g., an acetal plastic). The first base member 50 is sized and shaped to fit over the top end of the first pole section 28 such that a collar 54 rests generally on the top end of the first pole section and a depending, semi-cylindrical skirt 56 engages one side of the first pole section adjacent thereto. A central opening of the collar 54 is sized to permit the second pole section 30 to pass freely through the first base member 50. Metal thread elements 58 are force fitted into openings (not shown) in the skirt 56. The semi-cylindrical second base member 52 engages the opposite side of the first pole section 28 just below the top end and is attached to the skirt 56 of by bolts 62 which pass through the second base member and into the thread elements 58 in the skirt. Thus, the base 48 is held on the top end of the first pole section 28 by engagement of the collar 54 with the end of the first pole section and by the clamping action of the opposed skirt 56 and second base member 52 through their interconnection by the bolts 62. The concave opposing surfaces of the skirt 56 and the second base member are overmolded with a softer elastomeric material 64 which grippingly engages the first pole section 28 to further assist holding the base in a fixed longitudinal position on the first pole section. Only the concave surface and elastomeric material 64 of the second base member 52 can be seen in the drawings (FIG. 4), the shape and arrangement of the concave surface and elastomeric material of the skirt being substantially identical thereto. The elastomeric material 64 is preferably injection molded onto the skirt 56 and second base member 52, previously also formed by injection molding. The skirt and clamp each are formed with cavities and passages (not shown) into which the elastomeric material flows, thereby connecting the elastomeric material to the skirt and clamp.

The first base member 50 further includes a pair of diametrically opposite supports 66 projecting axially upward from the collar 54 of the first base member for supporting an upper clamping assembly operable to clamp the second pole section 30 in a fixed position of extension relative to the first pole section 28. The upper clamping assembly comprises a front clamping jaw 68 and a rear clamping jaw 70 formed of the same rigid plastic as the first and second base members 50, 52. The rear clamping jaw 70 is generally semi-cylindrical in shape and includes a pair of spaced apart ears 72 projecting outward from the rear clamping jaw. The ears 72 are each formed with an elongated opening 72A which receives a pivot pin 74 mounting the lever 34 on the rear clamping jaw 70. The front clamping jaw 68 is attached to the rear clamping jaw 70 by a pair of bolts 76 which pass through the front clamping jaw and respective middle openings 66A in the supports 66 of the base 48 and into the rear clamping jaw. The bolts 76 each pass through the semi-cylindrical portion of the rear clamping jaw 70 and into a respective one of the elongate openings 72A in the ears 72. The middle portion of each bolt 76 is smooth to permit the front and rear jaws 68, 70 to slide on the bolt. Four coil springs 78, each extending through a respective spring hole 66B in the supports 66 of the base 48, are interposed between the front and rear clamping jaws 68, 70, biasing the jaws apart from each other and away from the second pole section 30 to an unlocked position.

Actuation of the locking mechanism 32 to move the front and rear clamping jaws 68, 70 between the locked and unlocked positions is accomplished by the lever 34, mounted for pivoting about a horizontal axis by the pivot pin 74. The ends of the pivot pin are received in the elongate openings 72A of the ears 72 of the rear clamping jaw 70, and are capable of relative movement lengthwise of the elongate openings. The bolts 76 interconnecting the front and rear clamping jaws 68, 70 pass through and are threadably engaged with the pivot pin 74 within the elongate openings 72A of the ears. The threaded engagement of the bolts 76 in the pivot pin 74 fixes the distance between heads 76A of the bolts and the pivot pin, and consequently the distance between the axis of rotation of the lever 34 and the bolt heads. This distance can be adjusted in manufacture of the surveying pole 26 to select the initial clamping force applied by the jaws 68, 70 to the second pole section. In this way, the locking mechanism 32 can be adapted for use with poles (or rods) of different materials and for different applications where more or less clamping force is appropriate. Camming action of the lever 34 produces movement of the front and rear clamping jaws 68, 70 between the locked and unlocked positions. The lever 34 includes an attachment end having a passage through which the pivot pin 74 is received. The attachment end is asymmetrical with respect to the passage, having a greater thickness of material (relative to the passage) on a rounded locking surface 80 than on a flat unlocking surface 82. In the unlocked position, the lever 34 extends laterally outward from the locking mechanism 32 and the flat unlocking surface 82 engages the rear clamping jaw 70, allowing the maximum space between the heads 76A of the bolts and the pivot pin 74. Thus, the front and rear clamping jaws 68, 70 are able to move under the bias of the coil springs 78 away from each other and out of engagement with the second pole section 30. When the lever 34 is pivoted down on the pivot pin 74 the rounded locking surface 82 engages the rear clamping jaw 70, simultaneously pushing the rear clamping jaw forward and pulling (by operation of the bolt heads 76A) the front clamping jaw 68 rearward to clamp against the second pole section 30.

The front and rear clamping jaws 68, 70 are each attached to the collar 54 of the base 48 in such a way as to insure that the jaws will both move away from the second pole section 30 when the lever 34 is moved from the locked position to the unlocked position. The front and rear clamping jaws 68, 70 each have tabs (designated 68A and 70A, respectively in FIG. 9) projecting down into respective slots 84 in the collar 54 which open into the central opening of the collar. As the front and rear clamping jaws 68, 70 move together and apart under actuation by the lever 34, the tabs 68A, 70A move in the slots 84. It will be understood that as soon as the tabs 68A, 70A of each jaw reach the outer end of the slot 84, further motion away from the second pole section 30 is prohibited. Thus, the slots 84 do not allow all of the movement front and rear clamping jaws 68, 70 which is permitted in the unlocked position to be taken up by only one of the jaws. If one of the jaws 68, 70 reaches the end of its corresponding slots 84 first, it will stop and the biasing force of the coil springs 78 will be applied solely to the other jaw to force it outward. Thus, the locking mechanism 32 is inhibited from sticking when the lever 34 is moved to the unlocked position so there is no interference with the easy extension or retraction of the second pole section 30 relative to the first pole section 28 in the unlocked position.

Figure 6:
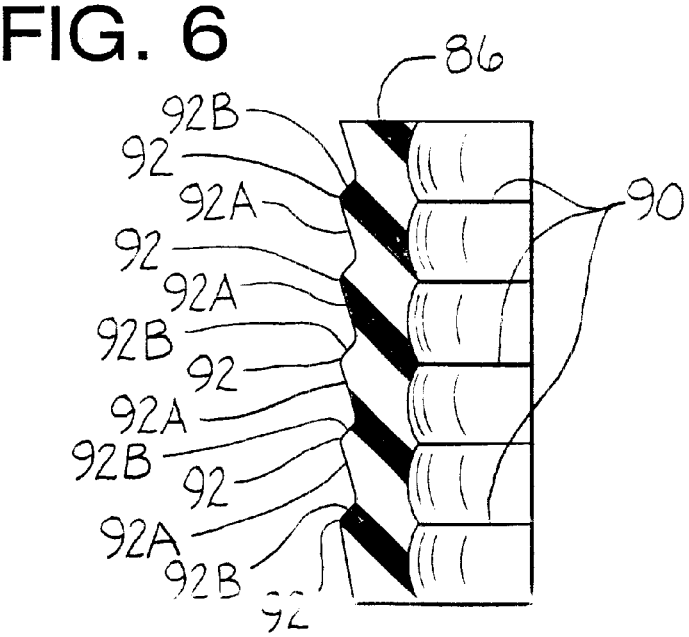
FIG. 6 is a longitudinal section of an elastomeric member associated with the front jaw taken in the plane including line 6—6 of FIG. 4.
Figure 7:
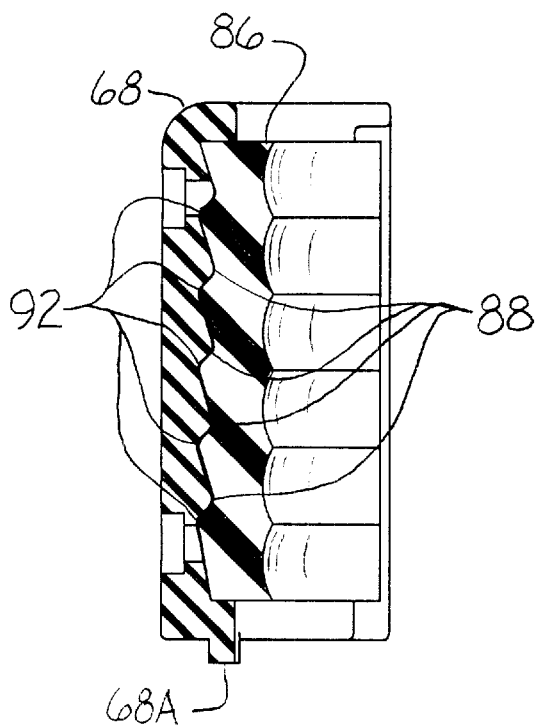
FIG. 7 is a longitudinal section of the front jaw assembled with the elastomeric member.

The locking mechanism 32 is constructed to tightly grip the second pole section 30 in the locked position without high clamping forces being applied to the second pole section which could crush the second pole section. In that regard the upper clamping assembly further includes elastomeric pads 86 (FIG. 4) which are overmolded onto the hard plastic of the front and rear clamping jaws 68, 70, respectively. The clamping jaws 68, 70 are formed with internal cavities and passages into which the elastomeric pad material flows, joining the elastomeric pad 86 to the jaw. The elastomeric pads 86 avoid point contact of the jaws 68, 70 with the second pole section 30 to more evenly distribute the clamping force. In that regard, the elastomeric pads 86 have a radius of curvature which is equal to the radius of the second pole section 30. The pads 86 conform to the available volume as they are clamped against the second pole section 30 which facilitates full contact between the pads and the second pole section, and more even application of pressure. The elastomeric pads 86 should be made of a material which is sufficiently resilient and has a high coefficient of friction. In the preferred embodiment, the elastomeric pads are made of a suitable rubber like substance, and preferably a substance having a durometer of 25–45 Shore A and a compression set of less than 30%. The front and rear clamping jaws 68, 70 and elastomeric pads 86 are constructed and arranged relative to each other to enhance the gripping action of the elastomeric pad when the second pole section 30 is subjected to forces tending to cause axial movement of the second pole section. The pertinent construction of the front and rear clamping jaws 68, 70 and elastomeric pads is identical. Therefore, explanation will be made with reference to FIGS. 5–7 showing only the front jaw 68.

Figure 5:
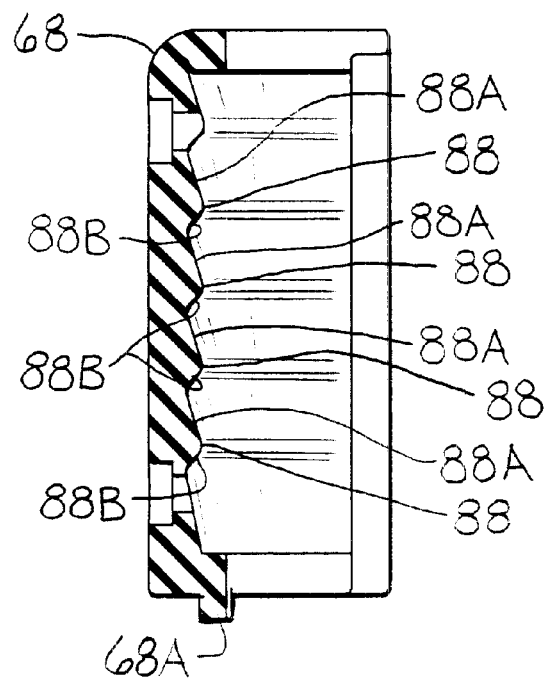
FIG. 5 is a section taken of a front jaw of the locking mechanism in the plane including line 5—5 of FIG. 4.
Figure 7A:
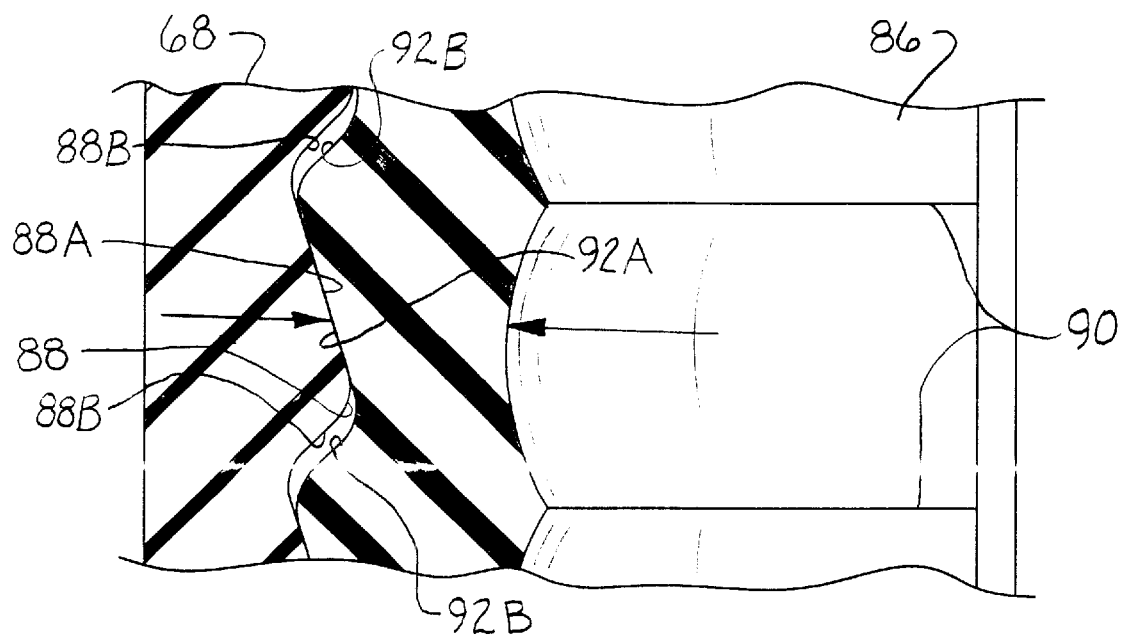
FIG. 7A is an enlarged detail of FIG. 7 illustrating the operation of the front jaw under axial forces tending to extend the surveying pole from its selected height.
Figure 8:
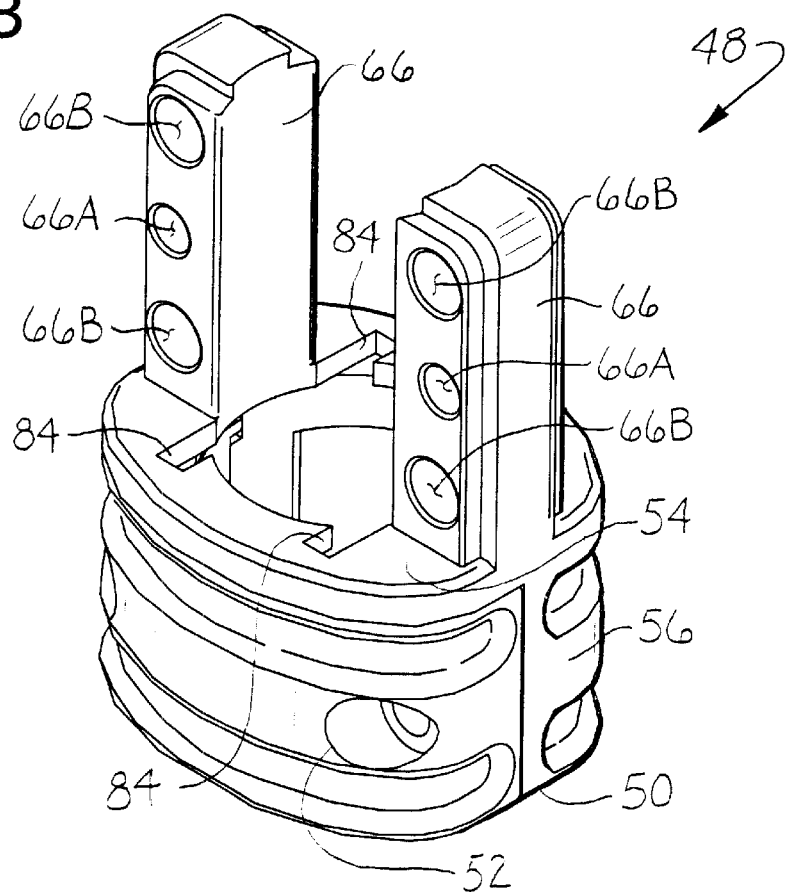
FIG. 8 is a perspective of a base of the locking mechanism.
Figure 9:
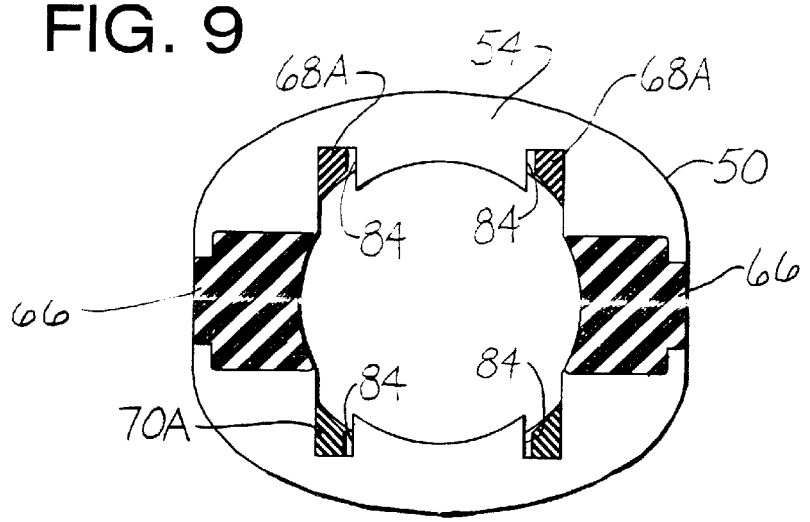
FIG. 9 is a horizontal section taken in the plane including line 9—9 of FIG. 3.

FIG. 5 is a longitudinal section of the front clamping jaw 68 with the elastomeric pad 86 removed. A center section of a concave interior face of the jaw 68 is made to have generally wedge-shaped formations 88 having a longer leg 88A and a shorter leg 88B. The elastomeric pad 86, shown in longitudinal section in FIG. 6, has symmetrical ridges 90 on its interior face for engaging the second pole section 30, and wedge-shaped formations 92 on its exterior face. The peaks of the ridges 90 and the wedge-shaped formations 92 of the elastomeric pads 86 are nearly directly opposed from each other so that the elastomeric pad is thickest at these peaks. The wedge-shaped formations 92 of the elastomeric pad have a shape which is complementary to (i.e., having long and short legs 92A, 92B) and are interfitted with the wedge-shaped formations 88 of the front clamping jaw 68, as may be seen in FIG. 7. The interfitted wedge-shaped formations 88, 92 provide additional gripping force when the second pole section 30 is subjected to forces tending to move the second pole section axially in extension or retraction relative to the first. The configuration and arrangement of the wedge-shaped formations 88, 92 are particularly selected to resist the more common axial forces tending to cause the second pole section 30 to retract into the first pole section 28. Forces tending to induce axial movement of the second pole section 30 are experienced by the elastomeric pad 86 as shearing forces. The mating of the wedge-shaped formations 88, 92 places legs 88A, 88B of each formation of the front clamping jaw 68 in a partially axially opposed relation with the legs 92A, 92B of the wedge-shaped formations of the elastomeric pad 86, and thereby inhibits relative movement of the elastomeric pad relative to the front clamping jaw in an axial direction. Any small movement which may occur results in the peaks of the wedge-shaped formations 92 of the elastomeric pad riding up toward the peaks of the wedge-shaped formations 88 of the front clamping jaw 68. This squeezes the elastomeric pad 86 as indicated by the double arrows in the enlarged, fragmentary section shown in FIG. 7A. The resiliency of the elastomeric pad 86 causes it to apply more pressure as it is compressed, and greater holding force against the second pole section 30, preventing its permanent movement relative to the first pole section 28 when the locking mechanism 32 is locked. Thus, the locking mechanism 32 of the present invention is capable of applying a substantial holding force without a large initial clamping force so that the non-metallic material of the second pole section 30 is guarded from damage by the locking mechanism. Moreover, the amount of the gripping force increases as the force tending to move the pole sections axially relative to one another increases.

Although it is important to keep the second pole section 30 from moving relative to the first pole section 28 when the surveying pole 26 is in use, there are occasions where it is desirable to completely remove the second pole section from the first section, such as for cleaning or repair. It is desirable to be able to remove the second pole section 30 from the first section 28 with a minimum of disassembly and reassembly work. However, the second pole section 30 must be able to remain connected to the first pole section 28 in any orientation when the pole sections are interconnected. The second pole section 30 of the present invention can be removed when the locking mechanism 32 is in its unlocked position, by application of sufficient axial force in the direction of extension.

Figure 10A:
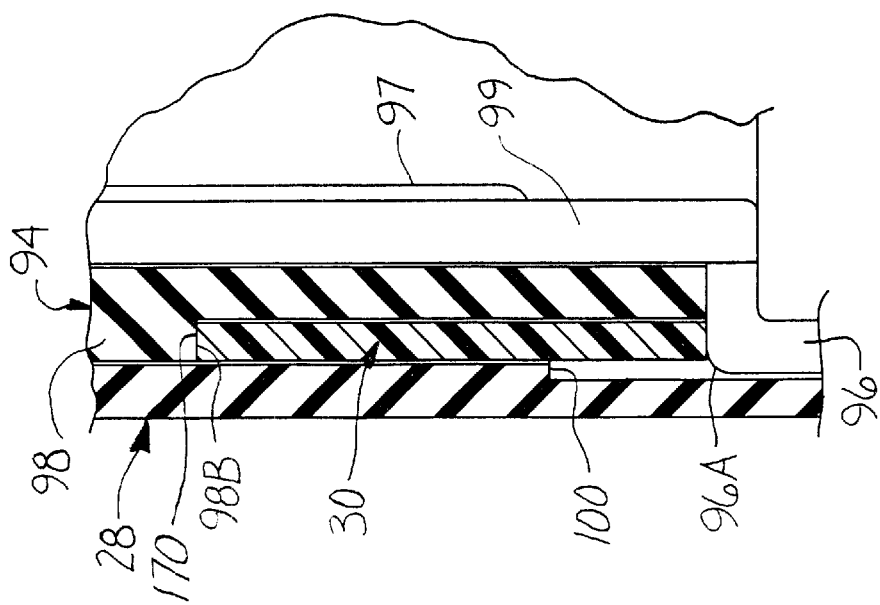
FIG. 10A is an enlarged portion of the section of FIG. 10.
Figure 10:
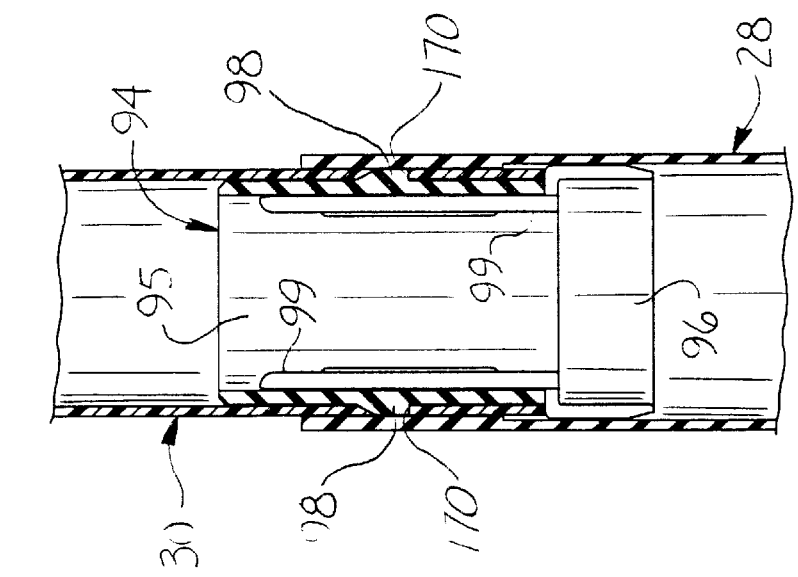
FIG. 10 a fragmentary longitudinal section of the surveying pole showing the releasable interconnection of pole sections.
Figure 12:
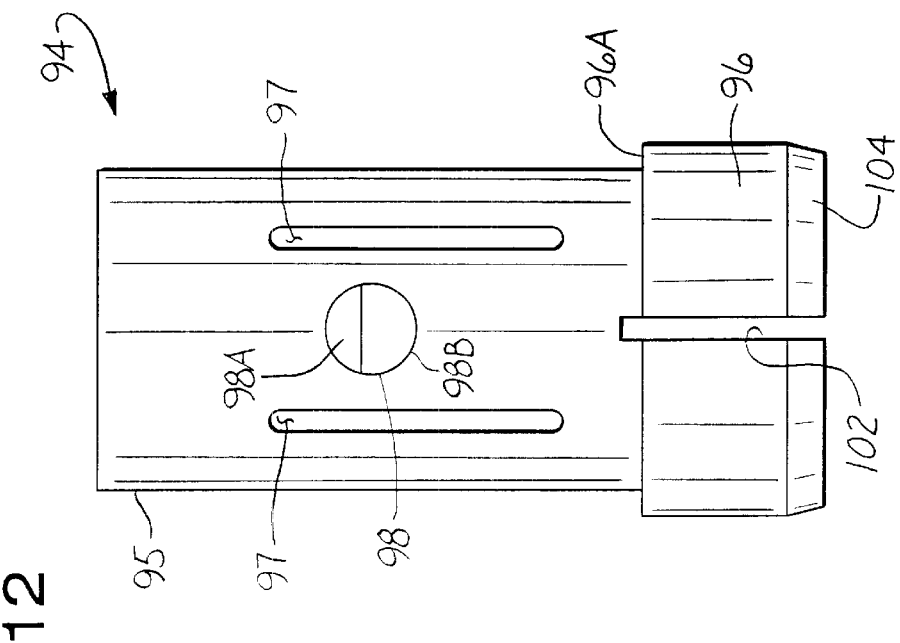
FIG. 12 is a right side elevation of the pole plug.
Figure 11:
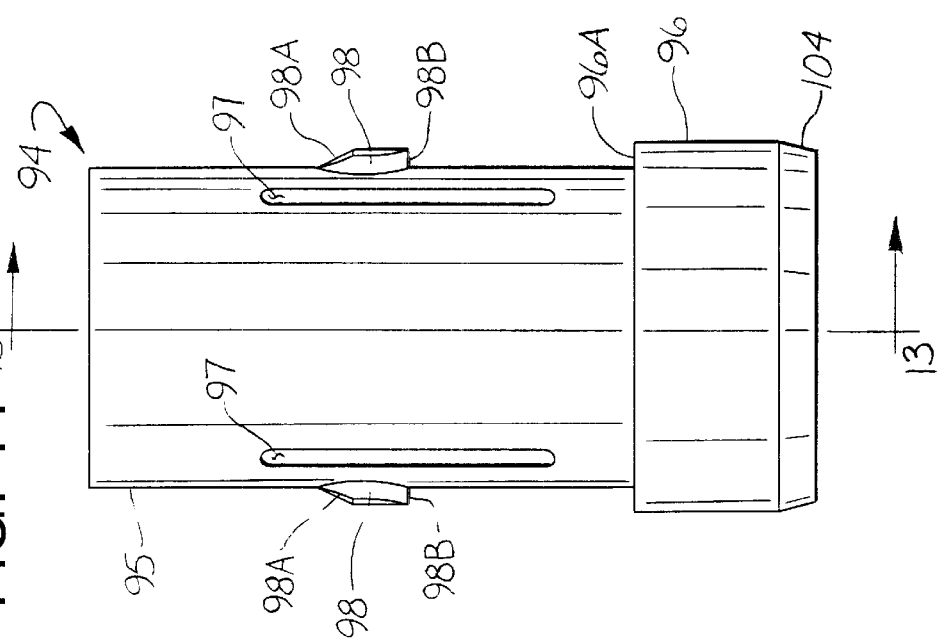
FIG. 11 is a front elevation of a pole plug.
Figure 13:
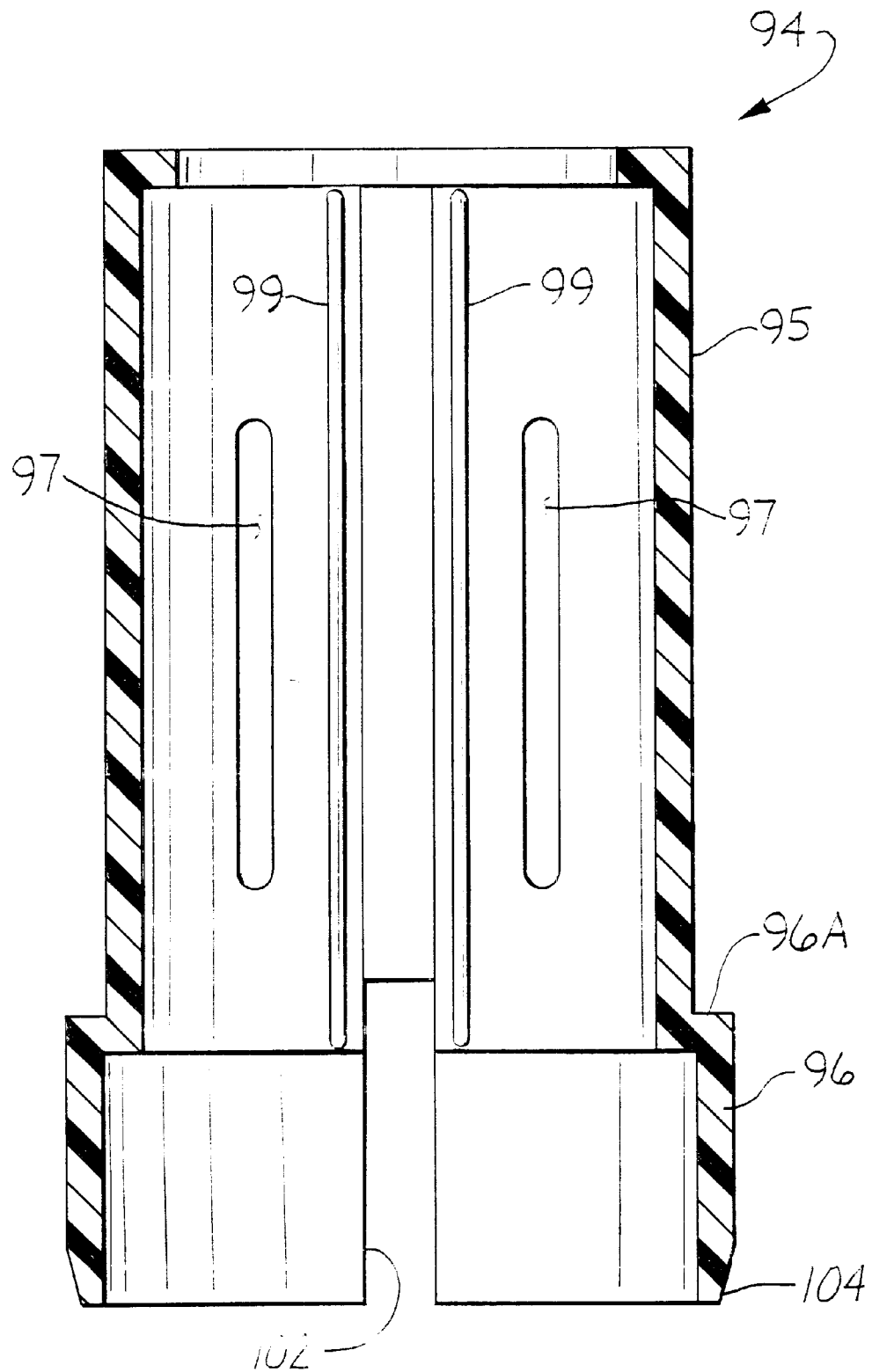
FIG. 13 is a longitudinal section of the pole plug taken in the plane including line 13—13 of FIG. 11.

Referring now to FIGS. 10–13, a resilient plastic pole plug (generally indicated at 94) is fitted into the lower end of the second pole section 30 (see FIG. 10). The pole plug 94 is generally tubular in shape, and has a smaller, upper portion 95 received in the second pole section 30 and an enlarged lower end 96 extending below the lower end of the second pole section which serves to hold the second section in the first pole section 28 as will be described. The upper portion 95 is formed with snap connection nubs 98 projecting radially outward from the upper portion (FIG. 11). The nubs 98 fit into respective holes 170 near the lower end of the second pole section 30 to affix the pole plug 94 in the second pole section. The nubs 98 have a sloped upper surface 98A which facilitates insertion of the plug 94 into the open lower end of the second pole section 30 until the nubs snap into the holes 170. To further facilitate deformation of the plug 94 necessary to insert it into the lower end of the second pole section 30, longitudinal slits 97 are formed in the plug on both sides of each nub 98. The slits 97 strategically weaken the side walls of the plug 94 for inward flexing between the slits when the plug is inserted into the lower end of the second pole section 30 and the nubs engage the inner surface of the second pole section. As shown in FIG. 13, there are ribs 99 on the interior of the plug 94 inside of each slit 97. The ribs 99 reinforce the side wall of the plug 94 to facilitate return to its original diameter when the nubs 98 come into registration with the holes 170 in the second pole section 30 for snapping the nubs into the holes. A lower axial surface 98B is substantially horizontal so as to prevent the plug 94 from being removed from the holes 170 in the second pole section 30 once inserted.

The first pole section 28 is formed with two different interior diameters near its upper end. The portion immediately adjacent to the upper end has a smaller interior diameter than portions of the first pole section 28 below that portion. Thus, an axially downwardly facing shoulder 100 (see FIG. 10A) is defined in the first pole section 28. The enlarged lower end 96 of the pole plug 94 projects radially outwardly from the exterior surface of the second pole section 30 defining an axially upwardly facing shoulder 96A (see FIGS. 10A and 13). When the first and second pole sections 28, 30 are assembled together, these shoulders 96A, 100 are in axially opposed relationship and will engage, if the second pole section 30 is extended from the first pole section 28 a sufficient distance, to prevent the withdrawal of the second pole section from the first pole section. However, the enlarged lower end 96 of the pole plug 94 is configured to flex radially inwardly upon application of sufficient axial force so as to allow the enlarged lower end to pass the shoulder 100 of the first pole section 28 so that the second pole section 30 can be pulled completely out of the first pole section. In that regard, the enlarged lower end 96 has diametrically opposed, axially directed slits 102 opening outwardly from the lower end of the pole plug 94 (FIGS. 12 and 13). These slits 102 strategically weaken the pole plug 94 and provide space to facilitate inward flexing of the halves of the enlarged lower end 96 on opposite sides of the slits. The second pole section 30 can be reinserted into the first pole section 28. The enlarged lower end 96 is radially deflected as the second pole section 30 is first inserted, and a chamfer 104 at the bottom of the enlarged lower end facilitates this deflection. Once the enlarged lower end 96 of the pole plug 94 passes the shoulder 100 of the first pole section 28, the lower end snaps out into position (i.e., with shoulder 96A of the enlarged lower end opposing the shoulder 100) to inhibit unintentional withdrawal of the second pole section 30 from the first pole section.

Surveying poles of the type to which the present invention generally relates are used outside in different environmental conditions and also tend to be handled roughly. Poles made of non-metallic material or a low strength metal may need additional protection to avoid damage when handled. For instance, the surveying pole 26 may become damaged if the second pole section 30 is violently retracted into the first pole section 28 after the pole has been used. It is known to provide dampening systems to reduce the shock experienced by the pole sections under these circumstances. However, these tend to be complex and require additional parts. The first and second pole sections 28, 30 of the present invention are sized so that the second pole section fits snugly within the first pole section. The contact between the pole sections is such that the seal is nearly airtight. Thus when the second pole section 30 is extended from the first the total internal volume of the surveying pole 26 is increased, initially drawing a slight vacuum within the surveying pole. Similarly, when the second pole section 30 is retracted within the first, there is an air pressure increase over atmospheric in the first pole section 28 as the internal volume of the surveying pole 26 is reduced.

Figure 14:
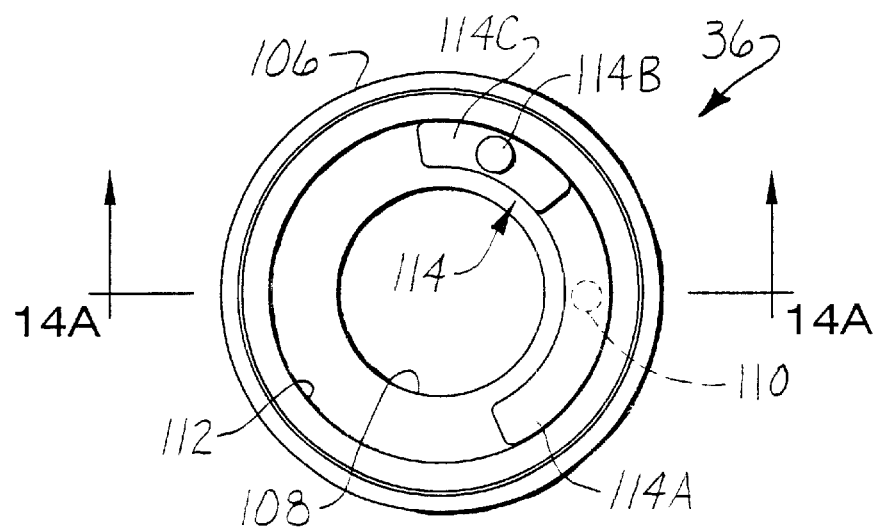
FIG. 14 is a bottom end view of a female pole end fitting including an air valve.
Figure 14A:
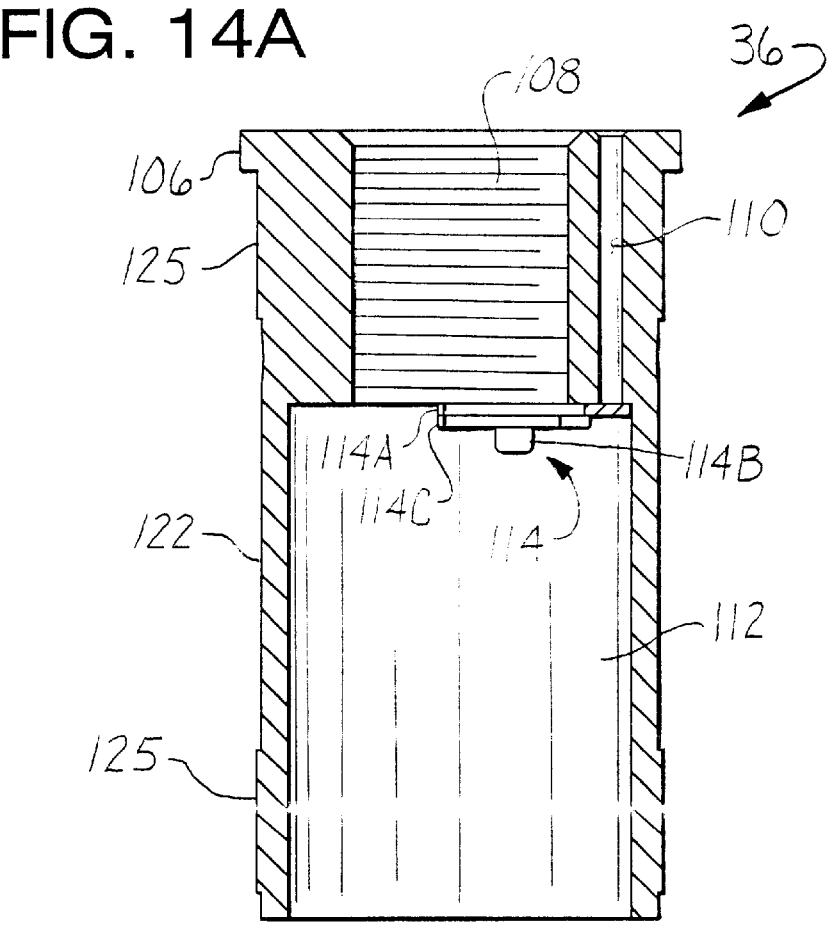
FIG. 14A is a section of the end fitting taken in the plane including line 14A—14A of FIG. 14.

The female fitting 36 in the upper end of the second pole section 30 is made out of machined aluminum. As shown in FIG. 14A, the female fitting 36 is tubular and has an upper annular lip 106 which rests against the end of the second pole section 30. A reduced inner diameter portion 108 of the fitting 36 has threads. In the embodiment illustrated in FIGS. 1 and 2, the reduced diameter portion receives the prism mount 37 for connecting the mount to the surveying pole 26. An air hole 110 in the fitting 36 extends from the top end of the fitting down into a larger inner diameter portion 112 of the fitting. The air hole 110 is formed in a annular region outside the threaded reduced diameter portion 108. The air hole 110 is sized to permit air to pass through the fitting 36 out of or in to the interior of the surveying pole 26 defined by the first and second pole sections 28, 30 at a controlled rate. In the most preferred embodiment, a valve generally indicated at 114 is provided, but the air hole 110 could be used without the valve and remain in the scope of the present invention. Moreover, additional air holes (not shown) can be provided for additional control of the rate of air passage through the fitting 36 out of the surveying pole 26.

The valve 114 functions as a check valve to permit air flow into the surveying pole 26 through the air hole 110 as the second pole section 30 is extended from the first pole section 28, and to prevent flow through the air hole when the second pole section is retracted. The valve 114 comprises an arcuate flap 114A mounted by a pin 114B on the interior of the female fitting 36 at the junction of the reduced and larger diameter portions 108, 112. In addition to the pin 114B a shorter arcuate piece 114C rests on top of one end of the flap 114A for strength (see FIG. 14). The flap 114A is made of a resilient, flexible material so that when the second pole section 30 is extended from the first pole section 28, the flap flexes down, uncovering the air hole 110 as air rushes into the surveying pole 26. However, when the second pole section 30 is retracted into the first pole section 28, air rushing to escape from the volume in the first pole section pushes the flap 114A over the air hole 110, blocking it from access by the air. The closure of the air hole 110 does not entirely prohibit air from escaping, but makes it seek out smaller openings (e.g., by passing through the threaded opening 108 around the mount 37). Thus the air resists retraction, acting as a cushion limiting the rate at which the second section 30 can be retracted into the first section 28 and softening the impact of the second pole section against the first as it reaches a fully retracted position. It will be understood that additional air holes (not shown) without a valve could be used in combination with the air hole 110 and valve 114 for more controlled air escape without departing from the scope of the present invention. Control may be achieved by sizing the air holes.

Figure 15A:
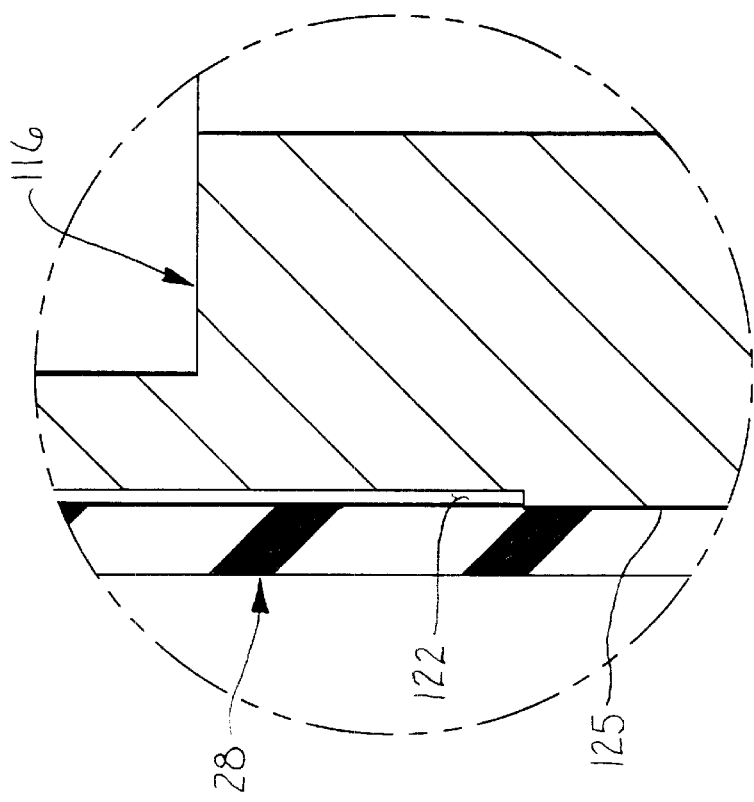
FIG. 15A is a further enlarged, fragmentary section of the surveying pole of FIG. 15 and illustrating a channel in the end fitting for glue.
Figure 15:
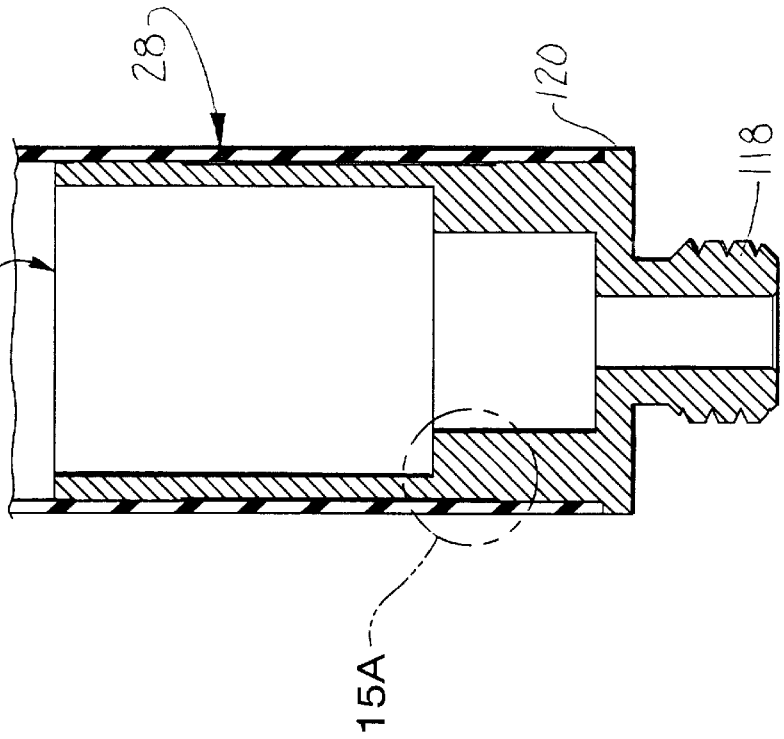
FIG. 15 is an enlarged fragmentary longitudinal section of the surveying pole showing a lower end of the pole including a male end fitting.
Figure 17:
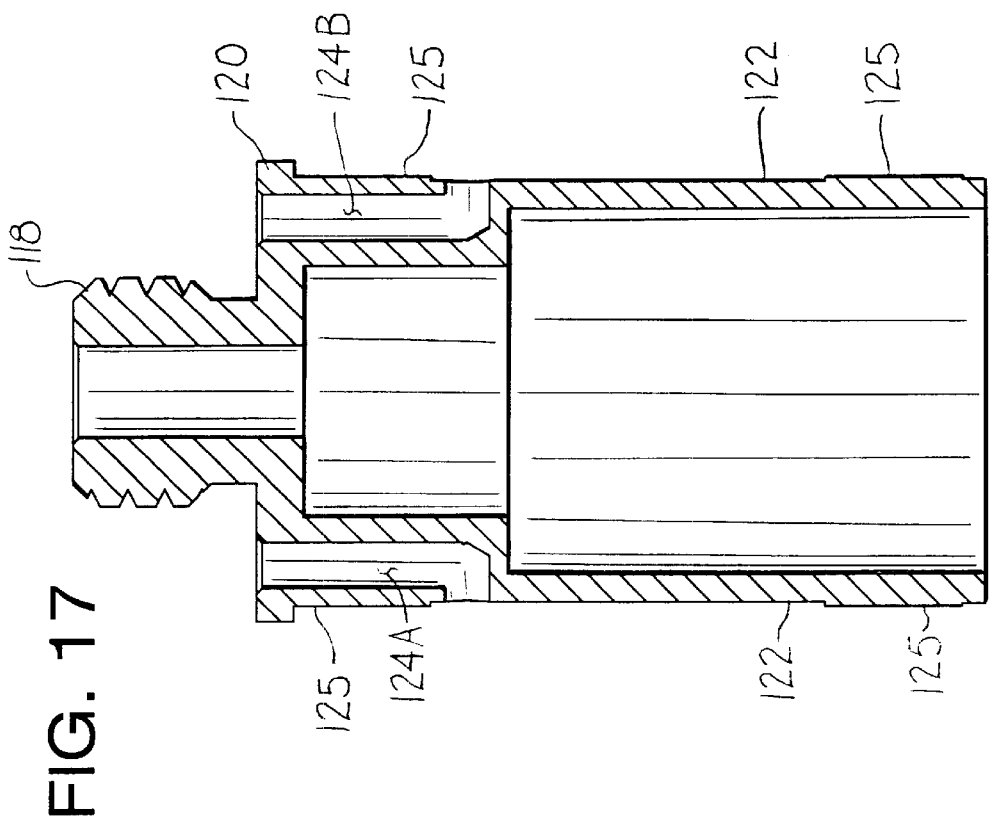
FIG. 17 is a longitudinal section of the male end fitting illustrating glue passages.
Figure 16:
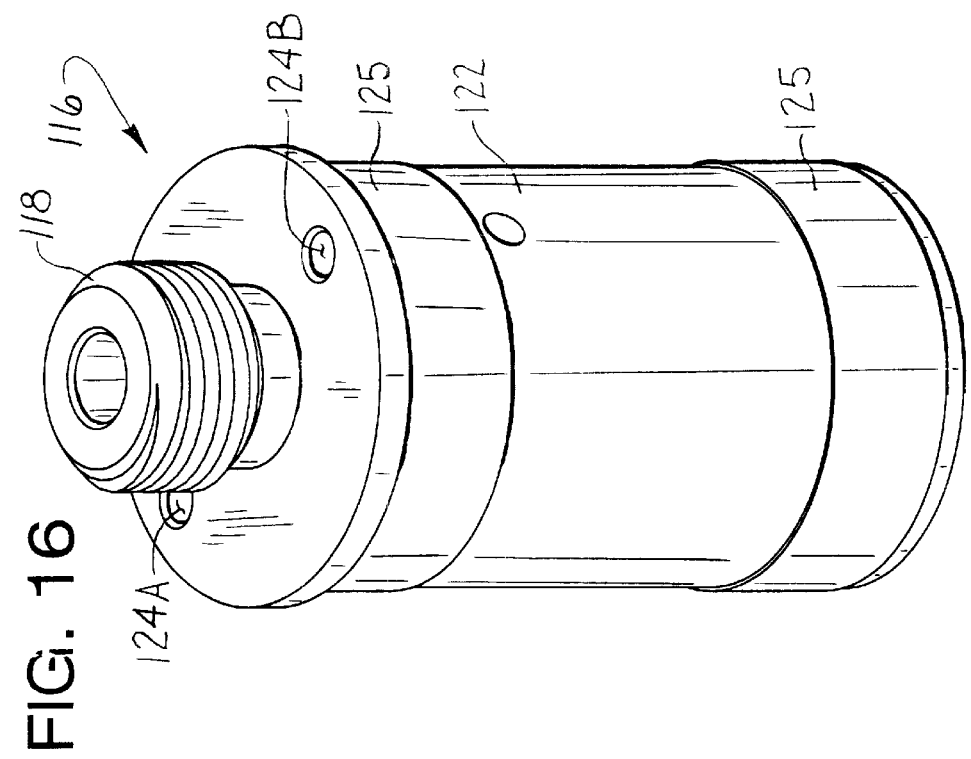
FIG. 16 is a perspective of the male end fitting inverted from its position shown in FIG. 15.

Referring to FIGS. 15–17, the first pole section 28 has an aluminum male fitting (generally indicated at 116) at its lower end which is similar in construction to the female fitting 36 of the second pole section 30, but has a threaded male end 118 projecting axially outward from the lower end of the fitting. The threaded end 118 mounts the point 44 of the surveying pole 26 onto the first pole section 28. The male fitting 116 is generally tubular in shape and includes a lip 120 which engages the lower end of the first pole section 28 fixing the axial position of the male fitting. Both the female and male fittings 36, 116 are constructed to achieve precise location in their respective pole sections 30, 28. In particular, they are constructed to permit affixation after insertion into the end of the pole section. This construction is identical for both the female fitting 36 and the male fitting 116, and will be described only in regard to the male fitting. The male fitting 116 has a shallow circumferential channel 122 extending completely about the fitting intermediate the ends of the fitting (see FIGS. 15 and 15A). In addition, two diametrically opposite adhesive passages (designated 124A and 124B, respectively) are formed in the fitting 116 which open at the lower end of the fitting and into the channel 122, as best seen in FIGS. 16 and 17. The precise number of passages may be other than described without departing from the scope of the present invention.

A flowable, thermosetting adhesive may be injected through one of these passages (e.g., passage 124A) into the channel 122. The adhesive has not been illustrated in FIG. 15A so that the channel 122 can be clearly seen, but would be filled with adhesive in a completed surveying pole section 28. Thus, the fitting 116 can be press fitted into the end of the first pole section 28 without application of any adhesive, and positively located by the engagement of the lip 120 with the end of the first pole section. The lip 120 and other portions 125 of the fitting 116 engaging the first pole section 28 are formed very precisely so that close axial alignment is achieved. After insertion of the fitting 116, adhesive is injected through one of the passages 124A into the channel 122. The adhesive flows in both directions around the channel 122 and fills the channel. When the channel 122 is filled, adhesive passes into the other passage 124B and out of the fitting 116 so that the person injecting the adhesive has visual confirmation from outside the first pole section 28 that the channel is completely filled. The interior surface of the first pole section 28 opposite the channel 122 is preferably roughened to promote bonding. The channel 122 and interior surface of the first pole section 28 when the fitting 116 is inserted into the pole section define a fixed volume of adhesive within the pole section. By selecting the size, and particularly the depth of the channel 122 an optimal amount of adhesive may be placed in each and every fitting that is attached to a pole section, with no requirement for skill on part of the person doing the assembly. The selection of the axial dimension of the channel 122 controls the spread of the adhesive layer, and the depth of the channel controls the bondline thickness. Particular adhesives will have optimum ranges for both spread and bondline which can be precisely accommodated by the channel. It is also envisioned that the channel could be formed in the pole section rather than in the fitting 116.

Figure 18:
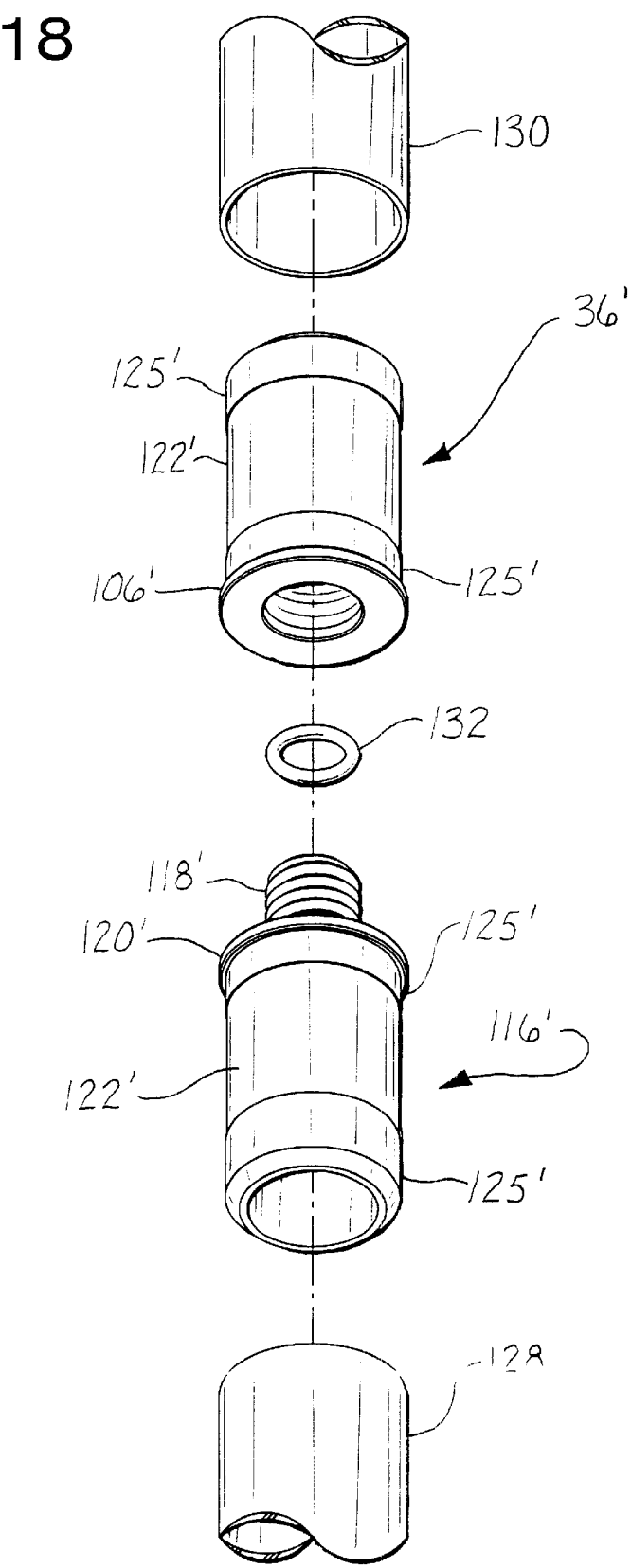
FIG. 18 is an exploded, fragmentary perspective of two pole sections connected together by the male and female end fittings.

In some instances, the female and male fittings are used together to screw together pole sections, as is illustrated in FIG. 18. The surveying pole 26 of FIG. 1 has but two pole sections 28, 30, which are arranged in telescoping fashion. However for taller poles, there may be more than two telescoping sections. In other instances, the poles may consist solely of sections which screw together and do not telescope relative to each other. In addition, the fittings may be used in other than surveying poles. A specifically contemplated use is for collapsible legs of a tripod Although the pole sections are shown herein as being round, fittings of the type described could be used with pole sections of other non-circular cross sections. In that event, the fitting would have a matching cross section. As illustrated in FIG. 18, the female and male fittings 36', 116' are shown as exploded from third and fourth pole sections 128, 130, which are not a part of the FIG. 1 embodiment. The female and male fittings 36', 116' are of the same construction as the fittings 36 and 116 described above and bear the same reference numerals distinguished by the addition of a prime. In the joint illustrated, an O-ring 132 provides for sealing between the two pole sections 128, 130. Of course, the female and male fittings 36', 116' would first be independently adhered in the open ends of the third and fourth pole sections 128, 130, respectively. The O-ring 132 is preferably mounted on the threaded end 118' of the male fitting 116'.

Figure 19:
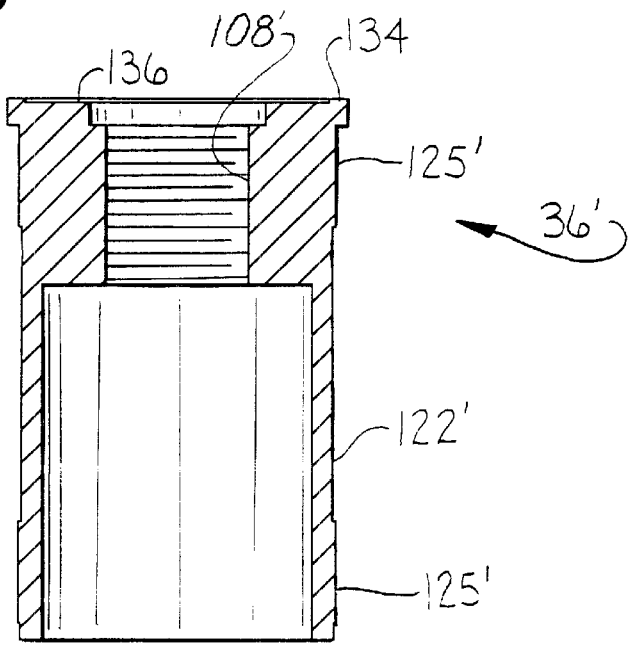
FIG. 19 is a longitudinal section of a female end fitting of another embodiment.
Figure 19A:
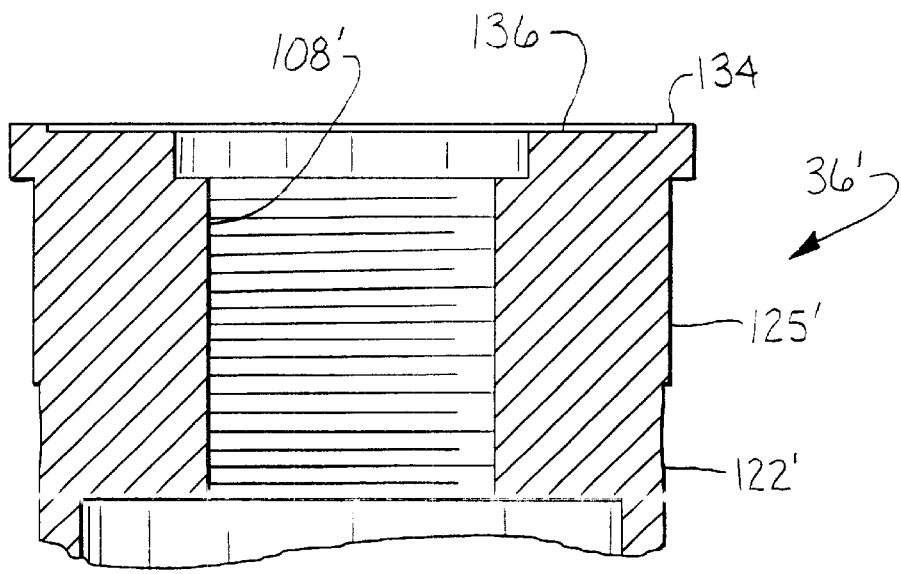
FIG. 19A is an enlarged, fragmentary portion of the section of FIG. 19.
Figure 20:
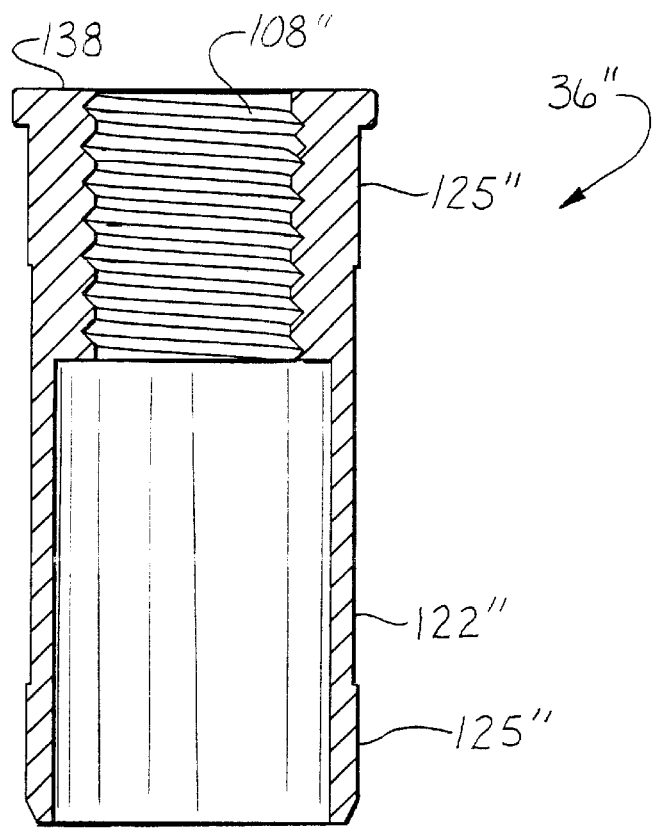
FIG. 20 is a longitudinal section of a female end fitting of still another embodiment.
Figure 20A:
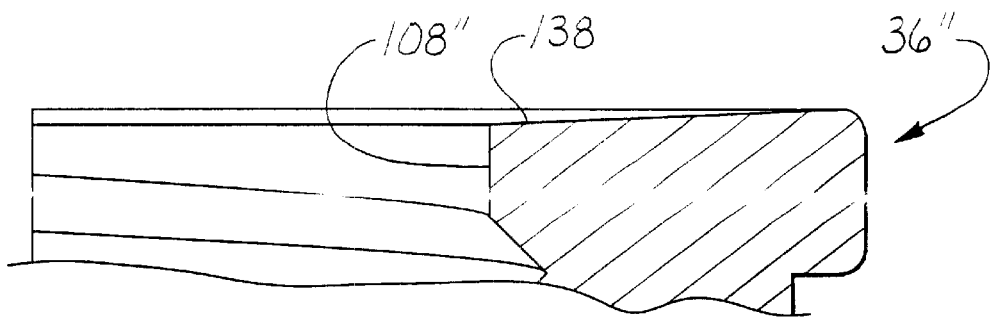
FIG. 20A is an enlarged, fragmentary portion of the section of FIG. 20.
Figure 22:
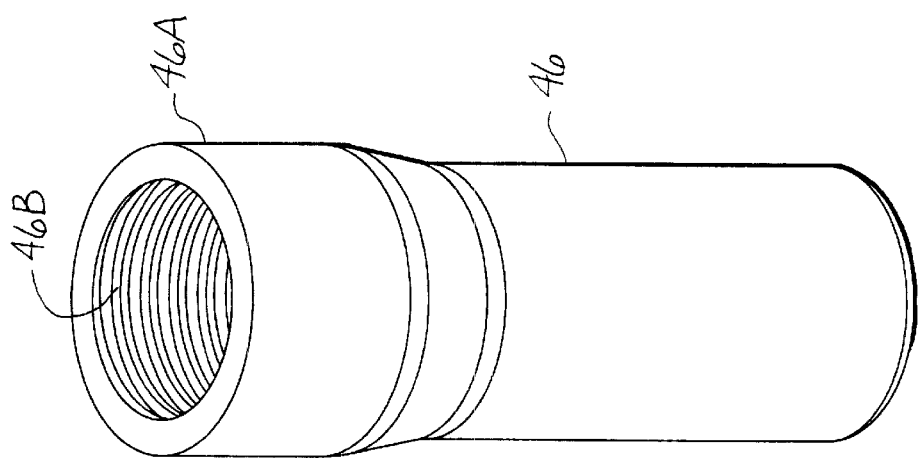
FIG. 22 is a perspective of the shoe.

The female and male fittings 36', 116' are particularly constructed to permit accurate axial alignment of the third and fourth pole sections 128, 130 when they are screwed together. A common difficulty for conventional screw-together sections is that debris between the fittings can cause one fitting (and hence one pole section) to be tilted slightly relative to the other. Even a relatively small bit of debris can significantly affect the alignment of the pole sections. Thus, the female and male fittings 36', 116' of the present invention are formed so that the area of contact of the fittings when screwed together is limited to a thin annular contact surface 134. The pertinent construction of the female and male fittings 36', 116' to form the annular contact surface 134 is the same, so only the construction of the female fitting 36' is shown (FIGS. 19 and 19A) and described hereinafter. The thin annular contact surface 134 is formed by machining a recessed area 136 everywhere on the end face of the female fitting except at the annular contact surface. Debris in opposed recessed areas 136 of the female and male fittings 36', 116' will generally not engage both fittings when the two are mated, and thus will not interfere with the axial alignment of the fittings. For smaller fittings, where it is difficult to machine a contact surface which is wide enough, an end face 138 of a female fitting 36" is beveled as shown in FIGS. 20 and 20A. The end face 138 of the fitting slopes axially inwardly from the peripheral edge of the end face to the central, threaded opening 108". The slope of the end face 138 is very small, but may be seen in the greatly enlarged fragmentary view of FIG. 20A. The male fitting (not shown) has the same construction except that the bevel terminates at the projecting threaded end.

Figure 21:
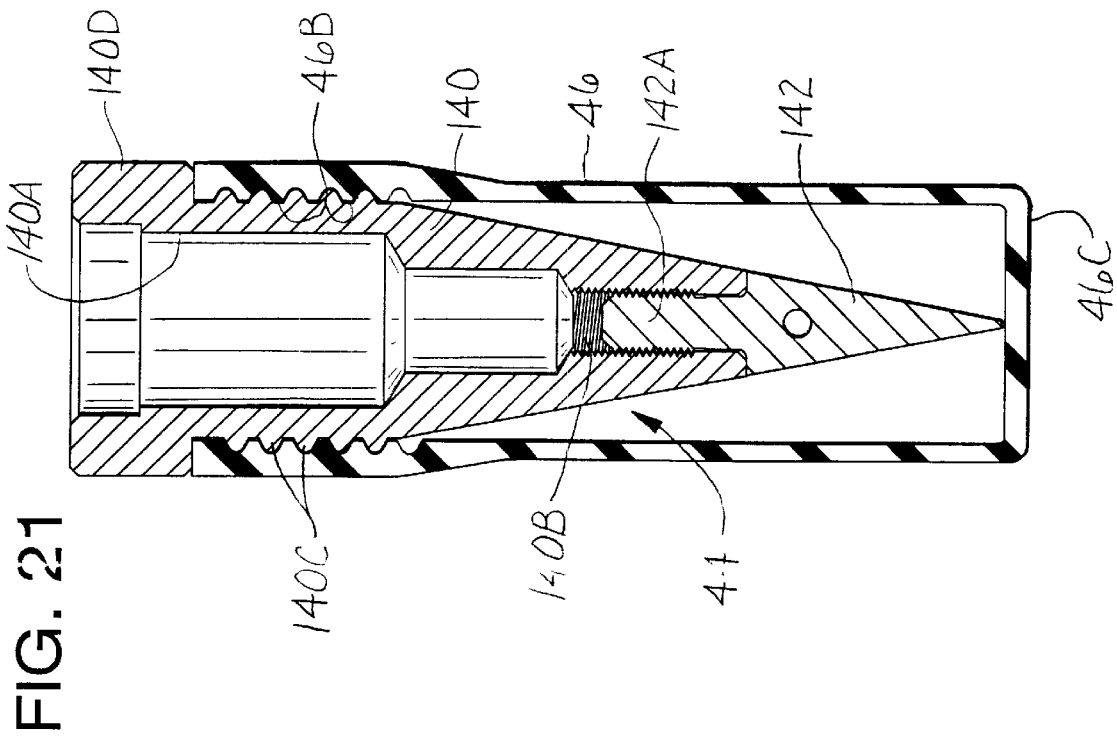
FIG. 21 is a longitudinal section of a point and covering shoe of the surveying pole.

Referring now to FIG. 21, the metal point 44 as covered by the shoe 46 in FIG. 1 is shown separated from the surveying pole 26. The metal point 44 includes a body 140 made of a lesser density material (e.g., aluminum) and a tip 142 made of a more dense material (e.g., steel). The body 140 has a central pole mounting bore 140A opening at the upper end of the body and extending into the body. The pole mounting bore 140A has threads at its upper end for threadably engaging the threaded end 118 of the male fitting 116 to attach the point 44 to the first pole section 28. The attachment of the point 44 to the surveying pole 26 is releasable, permitting the point to be removed if desired. The body 140 has an axially extending tip mounting bore 140B opening at the bottom of the body. The tip mounting bore 140B has internal threads engageable with corresponding threads on a male portion 142A of the tip 142. The dual construction of the point 44 reduces its overall weight. The tip 142 is smaller and less expensive than larger unitary points containing more material. If the tip 142 is broken, as is known to occur in the field, it is less expensive to replace.

Figure 25:
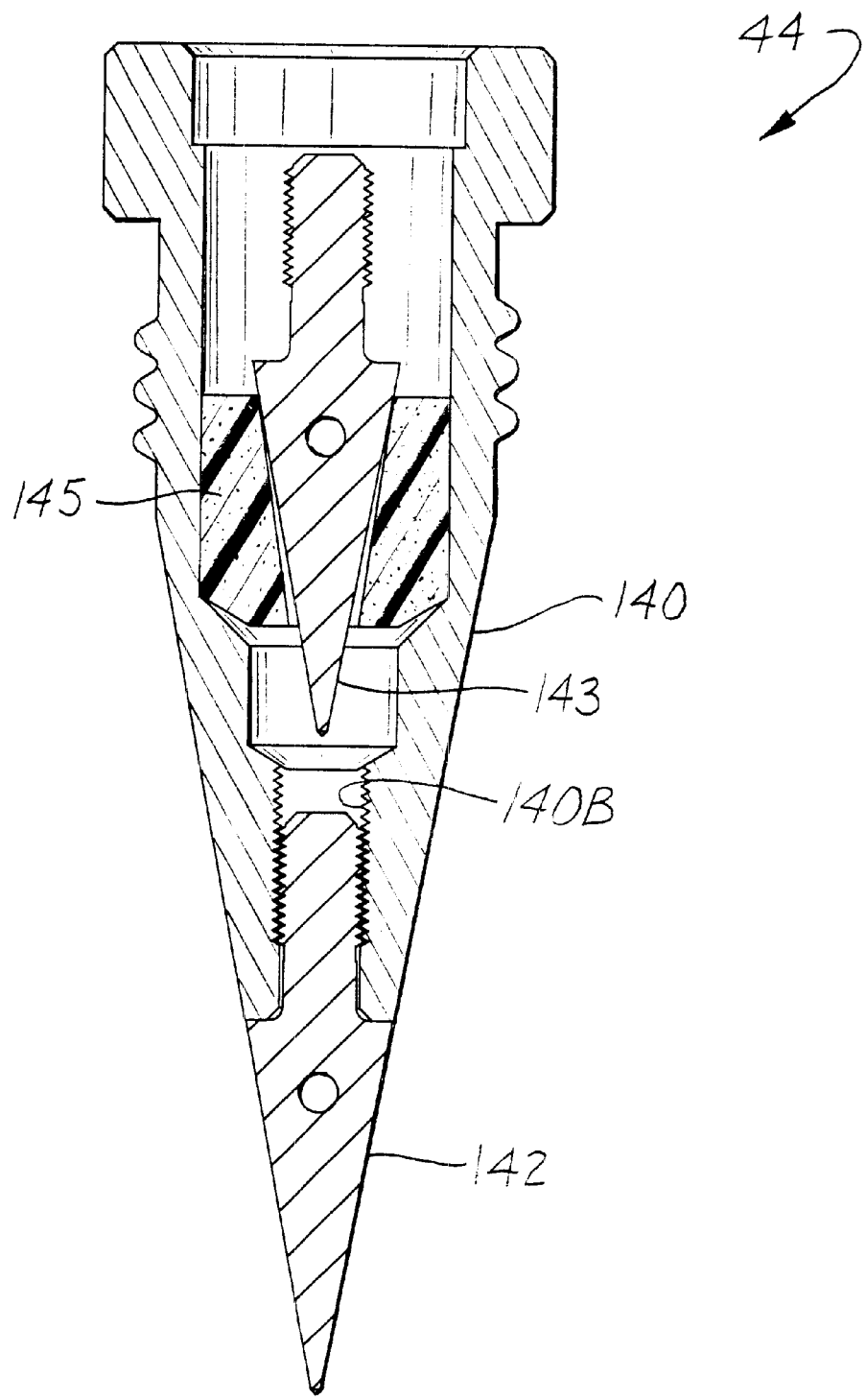
FIG. 25 is a section of the point illustrating storage of a spare tip for the point.
Figure 26:
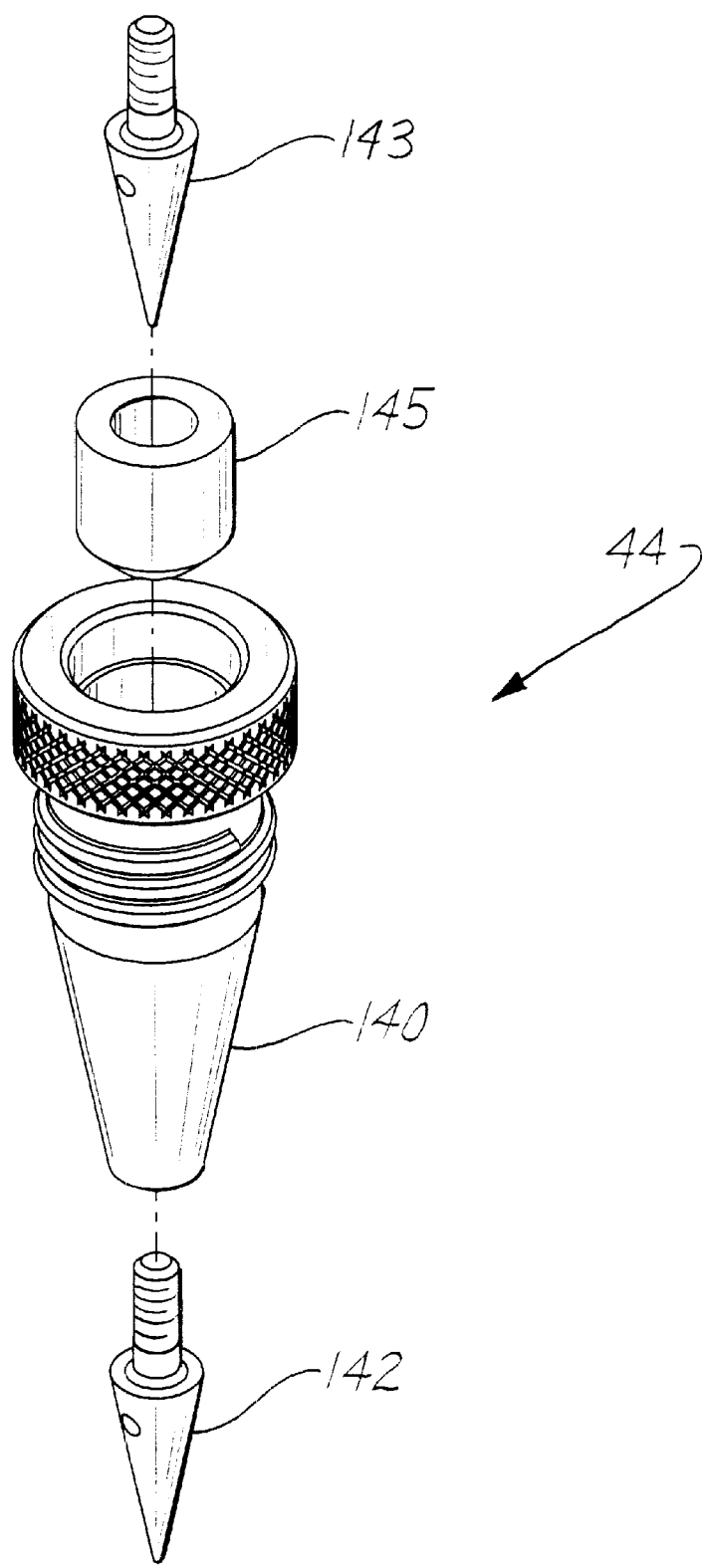
FIG. 26 is an exploded perspective of the point and spare tip.

As shown in FIGS. 25 and 26, the point is constructed to hold a spare tip 143. The interior of the body 140 of the point 44 is bored and counterbored to three different diameters. The lower bore is the tip mounting bore 140B. The upper two counterbores are sized to substantially receive the spare tip 143 held in the body 140 in an elastic, foam tube 145. The spare tip 143 preferably has a slightly larger maximum diameter than the opening of the tube 145 so that the tube bears against and holds onto the spare tip. The lower end of the tube 145 is beveled to facilitate location of the foam tube in the lower end of the upper counterbore to hold the tube and spare tip 143 in place in the body 140. As may be seen in FIG. 25, the spare tip 143 extends entirely through the tube 143 and the middle counterbore when stowed in the body 140. Should the tip 142 break or become worn, the point 44 can be removed from the surveying pole 26 by unscrewing the body 140 from the male fitting 116 at the lower end of the first pole section 28. The damaged tip 142 can be unscrewed from the body 140 and the spare tip 143 removed from the body and taken out of the tube 145. The spare tip 143 is screwed into the tip mounting bore 140B of the body 140, and the point 44 is reconnected to the surveying pole 26. If desired, the damaged tip 142 can be stowed in the body 140 in the same fashion as the spare tip 143.

The body 140 further includes external threads 140C located just below a larger, knurled head 140D of the body which contacts the end face of the male fitting 116 when the point 44 is attached to the surveying pole 26. These threads 140C mount the shoe 46 directly on the point 44 so that the shoe can be used without removing the point. Other types of connection, such as a bayonet type connection (not shown), may be used to attach the shoe without departing from the scope of the present invention. It is unnecessary to remove the point 44 when it is not needed, as it can simply be covered up by the shoe 46. In the illustrated embodiment, the shoe 46 is made of plastic (e.g., a polycarbonate plastic), but may be made of metal or other suitable material without departing from the scope of the present invention. The shoe 46 is tubular in shape and closed at its lower end. Its upper end margin 46A is flared outwardly to match the shape of the body 140, and has internal threads 46B which engage the external threads 140C of the body when the shoe is mounted on the point 44.

The shoe 46 is used is softer terrain to support the surveying pole 26 above the ground and prevent the pole from sinking into the ground. A flat bottom 46C of the shoe 46 has a surface area which is selected to distribute the weight of the surveying pole 26 sufficiently to prevent the pole from-sinking into the ground. Although the surface area of the flat bottom 46C is shown as being equal to the cross sectional area of the lower portion of the shoe 46, the flat bottom can be made to extend radially outwardly from the lower portion (and upper end margin 46A) of the shoe to increase the weight distribution of the surveying pole 26. A larger flat bottom would permit the surveying pole to be used on softer ground. The shoe 46 can also sheath the point 44 during transport which protects the tip 142 and personnel. When not in use, the shoe 46 can be conveniently stowed on the surveying pole 26 as will be described.

Figure 23:
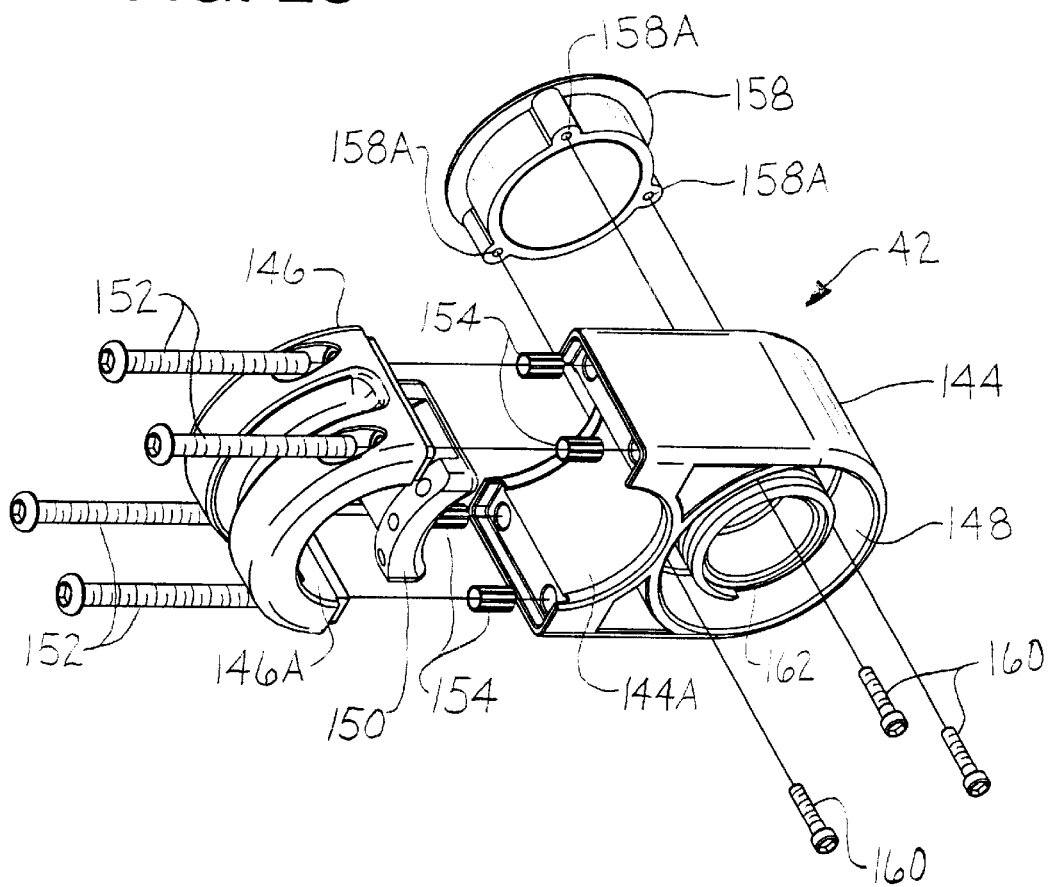
FIG. 23 is an exploded perspective of a level vial holder of the surveying pole.

The level vial holder 42 shown in exploded view in FIG. 23 is constructed to be clamped to the first pole section 28. The level vial holder 42 includes a first holder member 144 and a second holder member 146, each having an engagement surface (designated 144A, 146A, respectively) shaped in close correspondence to the circumferential shape of the first pole section 28. The first holder member 144 is made of a rigid plastic material (e.g., acetal plastic) and is free of other material on its engagement surface 144A so that when attached to the first pole section 28 the engagement surface engages and precisely locates the level vial holder 42 relative to the first pole section. In particular, the center axis of a round vial container portion 148 of the first holder member 144 is made parallel with the longitudinal axis of the surveying pole 26, as is required for the level vial 40 (see FIG. 2) to accurately indicate when the surveying pole is in a vertical orientation. The second holder member 146 has an elastomeric pad 150 overmolded onto its engagement surface 146A so that the high friction elastomeric pad engages the first pole section 28 to provide gripping action to hold the level vial 40 in position. The second holder member 146 is attached to the first member 144 by four bolts 152 which pass through corresponding openings in the second holder member into openings of the first holder member. The openings of the first holder member have previously received thread inserts 154 for engaging the threads of the bolts 152. It will be understood that in assembly, the first holder member 144 is placed on one side of the first pole section 28 and the second holder member 146 is placed on the other side of the first pole section diametrically opposite the first member. The bolts 152 are passed through the second holder member 146 and into the first holder member 144 and tightened down to clamp the holder members onto the first pole section 28 so that the level vial 40 is held in fixed position on the first pole section.

The level vial 40 (shown in FIG. 2) is received in the round portion 148 of the first holder member 144 and rests on an elastomeric support 156 therein. A cover 158 closes the level vial 40 in the round portion 148. The cover 158 is secured to the first holder member 144 by three bolts 160 which extend through the underside of the round portion 148 up into threaded holes 158A in the cover (see FIG. 24). The orientation of the level vial 40 can be adjusted by the bolts 160. The elastomeric support 156 permits pivoting movement of the level vial 40 within the level vial holder 42 to achieve the proper alignment with the surveying pole axis. The level vial 40 has been shown in full lines and not in cross section in FIG. 24 to simplify and increase the clarity of the illustration.

Figure 24:
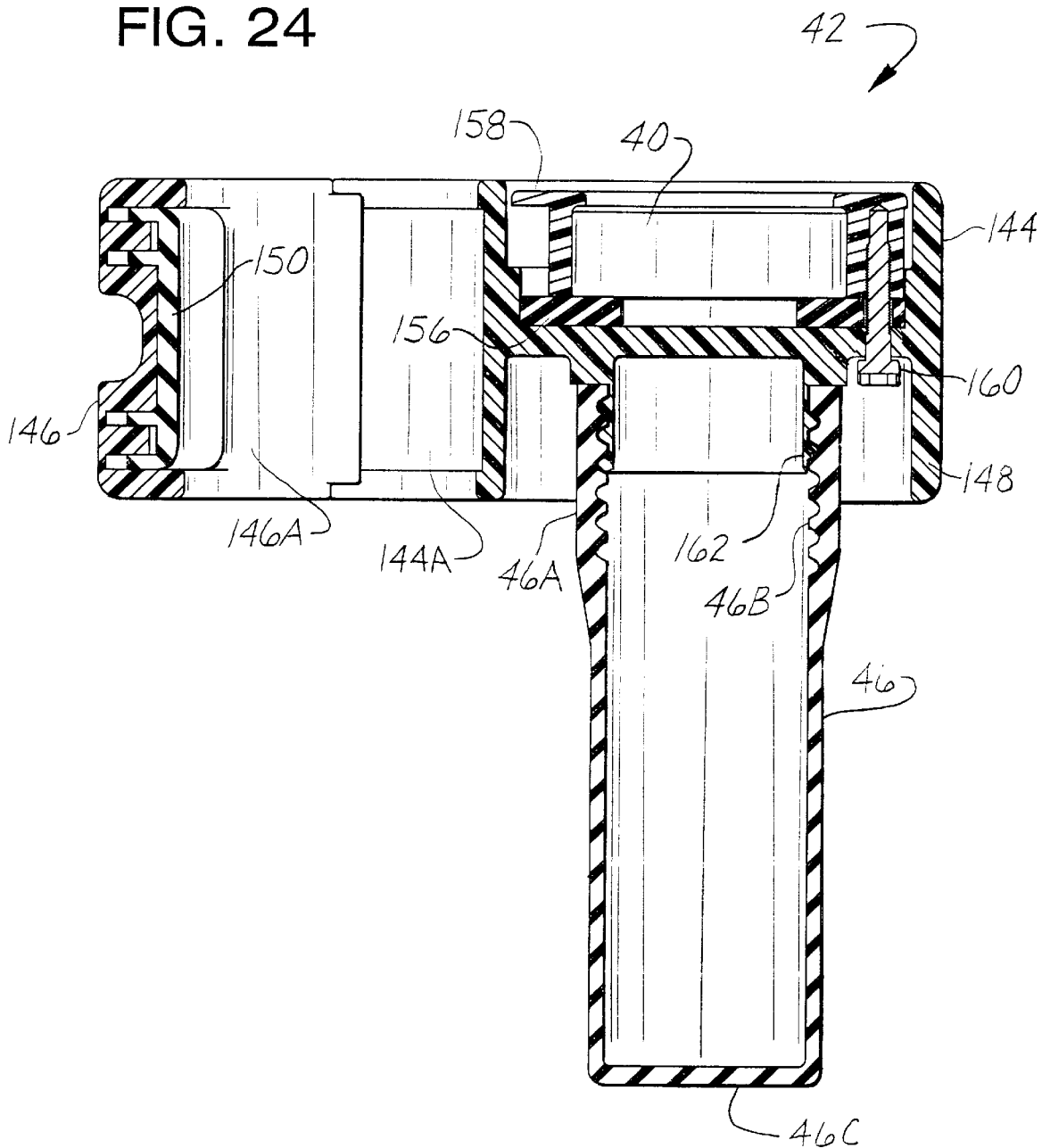
FIG. 24 is a section of the level vial holder having the shoe stowed thereon.

The round portion 148 of the first holder member 144 is formed to stow the shoe 46 on the surveying pole 26 when not in use. In this way, it is unnecessary to keep track of the shoe 46 when not in use. It is immediately available when needed. More specifically, the first holder member 144 has a depending portion 162 which is formed with external threads. The depending portion 162 is sized the same as the upper part of the body 140 which mounts the shoe 46 on the point 44. Thus, the internal threads 46B of the shoe 46 can engage the threads of the depending portion 162 to temporarily attach the shoe to the level vial holder 42 for stowing the shoe, as shown in FIG. 24. The shoe 46 may be connected to other parts of the surveying pole and/or by other types of connectors (not shown) without departing from the scope of the present invention.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A pole section for use in surveying equipment, the pole section being elongate and having opposite ends at least one of which is open, the pole section having an interior surface in the open end, a fitting received in the open end of the pole section, the fitting including first and second spaced circumferential engagement surfaces in contact with the interior of the pole section for precisely locating the fitting relative to the pole section and a circumferential channel located between the engagement surfaces, the channel being spaced from the pole section, and an adhesive located in the channel and bonding the fitting to the pole section.

2. A pole section as set forth in claim 1 wherein the fitting has an end facing outwardly from the pole section and an adhesive passage in the fitting, the adhesive passage opening at one end at the outwardly facing end of the fitting and at another end in the channel for use in delivering adhesive to the channel after insertion of the fitting into the open end of the pole section.

3. A pole section as set forth in claim 2 wherein the fitting further comprises an exit passage opening at one end at the outwardly facing end of the fitting and at another end in the channel, the exit passage being disposed generally on the opposite side of the fitting from the adhesive passage for receiving adhesive into the exit passage when the channel is substantially filled with adhesive thereby to indicate the channel is full.

4. A pole section as set forth in claim 3 wherein the fitting includes a connector element adapted for connecting to a connector element of the surveying equipment.

5. A pole section as set forth in claim 1 wherein the fitting includes an axially facing end surface having a surface area and facing axially outward from the pole section, the axially facing surface including a peripheral engagement portion constituting a first smaller portion of the axially facing surface area, and an axially recessed portion constituting a second larger portion of the surface area recessed axially from the peripheral engagement portion.

6. A pole section as set forth in claim 1 further comprising a level vial holder mounted on the pole section, the level vial holder comprising first and second holder members engageable with the pole section on generally opposite sides thereof, and adapted to be interconnected for clamping engagement with the pole section, the first and second holder members having respective engagement surfaces shaped at least partially in correspondence with the shape of an exterior surface of the pole section, the first holder member including the engagement surface being formed of a rigid material for positively locating the level vial holder relative to the pole section, the second holder member having an elastomeric pad on its engagement surface for enhancing frictional resistance to movement of the level vial holder axially of the surveying pole.

7. A pole section as set forth in claim 1 further comprising a point adapted for releasable mounting on a lower end of the pole section, the point comprising a body, a tip formed for releasable interconnection with the body, and a spare tip formed for releasable interconnection with the body, the body having a cavity therein sized and shaped to hold the spare tip when not in use.

8. A method of making a pole section for surveying equipment comprising the steps of providing an elongate member having opposite ends at least one of which is open and an interior surface inside the open end, providing a fitting having an end surface, first and second spaced circumferential engagement surfaces, a circumferential channel located between the engagement surfaces and an adhesive passage opening at one end at the end surface of the fitting and at another end in the channel, inserting the fitting into the open end of the elongate member such that the end surface faces axially outwardly of the open end of the elongate member and the circumferential engagement surfaces engage the interior surface and align the fitting with respect to the elongate member, injecting adhesive through the adhesive passage from the end surface of the fitting as inserted into the elongate member into the channel for bonding the fitting to the elongate member.

9. A method as set forth in claim 8 wherein the step of providing the fitting further includes providing a fitting having an adhesive exit passage opening at one end at the end surface of the fitting and at another end in the channel, the exit passage being disposed generally opposite the adhesive passage, and wherein the step of injecting adhesive comprises injecting adhesive into the adhesive passage until adhesive is detected passing out of the exit passage.

10. A pole section for use in surveying equipment, the pole section being elongate and having opposite ends, the pole section having an engagement surface near one of said ends, a fitting attached to the pole section at said one end thereof, the fitting including first and second spaced circumferential engagement surfaces in contact with the engagement surface of the pole section for precisely locating the fitting relative to the pole section and a circumferential channel located between the first and second spaced circumferential engagement surfaces, the channel being spaced from the pole section, and an adhesive located in the channel and bonding the fitting to the pole section.

11. A pole section as set forth in claim 10 wherein the fitting has an adhesive passage opening at one end thereof for receiving adhesive and at another end thereof in the circumferential channel for use in delivering adhesive to the channel after attachment of the fitting to the pole section.

12. A pole section as set forth in claim 11 wherein the fitting has an end facing outwardly from the pole section and the adhesive passage opens at one end at the outwardly facing end of the fitting.

13. A pole section as set forth in claim 11 wherein the circumferential channel has an exit passage opening at one end thereof to an exterior of the fitting and at another end thereof into the channel, the end of the exit passage opening into the channel being spaced from the end of the adhesive passage opening into the channel.

14. A pole section as set forth in claim 13 wherein the fitting has an end facing outwardly from the pole section and the exit passage opens at one end at the outwardly facing end of the fitting, the exit passage receiving adhesive when the channel is substantially filled with adhesive thereby to indicate the channel is full.

15. A pole section as set forth in claim 10 wherein at least one of the ends of the pole section is open and the fitting is received in the open end of the pole section.

16. A pole section as set forth in claim 10 wherein the fitting includes a connector element adapted for connecting to a connector element of the surveying equipment.

17. A pole section as set forth in claim 10 wherein the fitting includes an axially facing end surface having a surface area and facing axially outward from the pole section, the axially facing surface including a peripheral engagement portion constituting a first smaller portion of the axially facing surface area, and an axially recessed portion constituting a second larger portion of the surface area recessed axially from the peripheral engagement portion.

18. A pole section as set forth in claim 10 further comprising a level vial holder mounted on the pole section, the level vial holder comprising first and second holder members engaged with the pole section on generally opposite sides thereof, and interconnected in clamping engagement with the pole section, the first and second holder members having respective engagement surfaces shaped at least partially in correspondence with the shape of an exterior surface of the pole section, the first holder member including the engagement surface being formed of a rigid material for positively locating the level vial holder relative to the pole section, the second holder member having an elastomeric pad on its engagement surface for enhancing functional resistance to movement of the level vial holder axially of the surveying pole.

19. A pole section as set forth in claim 10 further comprising a point adapted for releasable mounting on a lower end of the pole section, the point comprising a body, a tip formed for releasable interconnection with the body, and a spare tip formed for releasable interconnection with the body, the body having a cavity therein sized and shaped to hold the spare tip when not in use.

20. A surveying pole for use in surveying, the pole comprising a first pole section being elongate and having opposite ends, the first pole section having an engagement surface generally at one of said opposite ends, a fitting attached at said one end of the pole section, the fitting including first and second spaced circumferential engagement surfaces in contact with the engagement surface of the pole section for precisely locating the fitting relative to the first pole section and a circumferential channel located between the first and second circumferential engagement surfaces, the channel being spaced from the pole section, and an adhesive located in the channel and bonding the fitting to the first pole section, and a second pole section telescopingly received in the first pole section, the second pole section being adapted for extension and retraction relative to the first pole section.

21. A surveying pole as set forth in claim 20 further comprising a point mounted on a lower end of the first pole section for engaging the ground, and a shoe sized and shaped for covering the point, the point and shoe being formed for releasable connection of the shoe to the point to selectively cover the point.

22. A surveying pole as set forth in claim 20 further comprising a shoe adapted for releasably mounting on a lower end of the first pole section, and a shoe holder mounted on the surveying pole, the shoe holder and shoe being formed for releasable connection of the shoe to the shoe holder for stowing the shoe when not in use.

23. A surveying pole as set forth in claim 20 wherein the second pole section is adapted for releasable, snap-together connection with the first pole section.

24. A surveying pole as set forth in claim 20 wherein the second pole section fits in a sealing sliding relation into the first pole section and the first and second pole sections are closed at their ends opposite the ends telescopingly interconnected, at least one of the first and second pole sections being formed with an air escape orifice therein to control the rate of flow of air out of the pole when the second pole section is retracted into the first pole section for cushioning the retraction of the second pole section.

25. A method of making a pole section for surveying equipment comprising the steps of providing an elongate member having opposite ends and an engagement surface near one of said opposite ends, providing a fitting having first and second spaced circumferential engagement surfaces, a circumferential channel located between the first and second spaced circumferential engagement surfaces and an adhesive passage for receiving adhesive into the channel, attaching the fitting to the elongate member such that the circumferential engagement surfaces engage the engagement surface of the pole section and align the fitting with respect to the elongate member, injecting adhesive through the adhesive passage into the channel for bonding the fitting to the elongate member.

26. A method as set forth in claim 25 wherein the step of providing the fitting further includes providing an adhesive exit passage in the fitting opening at one end outwardly of the fitting and at another end into the channel, and wherein the step of injecting adhesive comprises injecting adhesive into the adhesive passage until adhesive is detected passing out of the exit passage outside of the fitting.

27. A method as set forth in claim 25 wherein said step of attaching the fitting comprises inserting the fitting into an open end of the elongate member.

* * * * *